United States Patent
Maruyama et al.

[11] Patent Number: 5,898,540
[45] Date of Patent: Apr. 27, 1999

[54] MAGNETIC HEAD AND SLIDER CONFIGURATION FOR CONTACT RECORDING HAVING A PLURALITY OF TAPERED SURFACES

[75] Inventors: Yohji Maruyama, Iruma; Makoto Aihara, Kodaira, both of Japan

[73] Assignee: Hitachi, LTD, Tokyo, Japan

[21] Appl. No.: 08/650,196

[22] Filed: May 20, 1996

[30] Foreign Application Priority Data

| May 25, 1995 | [JP] | Japan | 7-126526 |
| Jul. 7, 1995 | [JP] | Japan | 7-171786 |

[51] Int. Cl.⁶ .................................................. G11B 5/60
[52] U.S. Cl. ............................................................ 360/103
[58] Field of Search ................................... 360/102–103, 360/104

[56] References Cited

U.S. PATENT DOCUMENTS

| 5,041,932 | 8/1991 | Hamilton | 360/104 |
| 5,067,037 | 11/1991 | Ananth et al. | 360/103 |
| 5,285,337 | 2/1994 | Best et al. | 360/103 |
| 5,327,310 | 7/1994 | Bischoff et al. | 360/103 |
| 5,418,667 | 5/1995 | Best et al. | 360/103 |
| 5,424,888 | 6/1995 | Hendriks et al. | 360/103 |
| 5,473,485 | 12/1995 | Leung et al. | 360/103 |
| 5,526,204 | 6/1996 | French et al. | 360/103 |
| 5,550,693 | 8/1996 | Hendriks et al. | 360/103 |

FOREIGN PATENT DOCUMENTS

| 53-29710 | 3/1978 | Japan | 360/103 |
| 1-298585 | 12/1989 | Japan . | |
| 2-101688 | 4/1990 | Japan . | |
| 3-250475 | 11/1991 | Japan | 360/103 |
| 4-17176 | 1/1992 | Japan | 360/103 |
| 42-81209 | 10/1992 | Japan . | |
| 51-14116 | 5/1993 | Japan . | |
| 6-44718 | 2/1994 | Japan . | |
| 6-52645 | 2/1994 | Japan . | |
| 6-60329 | 3/1994 | Japan . | |
| 6-150601 | 5/1994 | Japan | 360/103 |
| 61-50283 | 5/1994 | Japan . | |
| 7-21717 | 1/1995 | Japan . | |

OTHER PUBLICATIONS

"The Journal of the Magnetics Society of Japan", Issue 18, No. S1 p. 345, 1994.

*Primary Examiner*—Brian E. Miller
*Attorney, Agent, or Firm*—Kenyon & Kenyon

[57] ABSTRACT

A magnetic storage apparatus includes a magnetic head having sliding front and rear pads on its sliding surface. The front pads are tapered toward their front ends and the height of the front pads are higher than the height of the rear pad. The tapered front pads are coated with a thin film. The magnetic pad is provided with a total of three pads, two pads on its front side and one pad on its rear side. The sum area of the pads is within a range of 0.0003 to 0.02 mm². A recording and reproducing operation is performed with the front pads and the rear pad concurrently kept in contact sliding with the surface of a recording medium. A reliable contact sliding is thus performed with the pads kept in contact with the recording medium. The magnetic head reliably operates with its recording and reproducing component kept in close vicinity with the recording medium. Therefore, a reliable magnetic head and a magnetic storage apparatus employing it are provided.

9 Claims, 17 Drawing Sheets

FIG.1a
FIG.1d
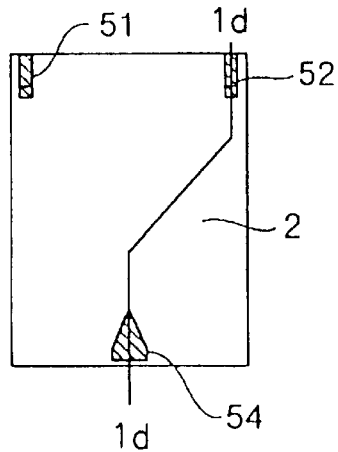
FIG.1b
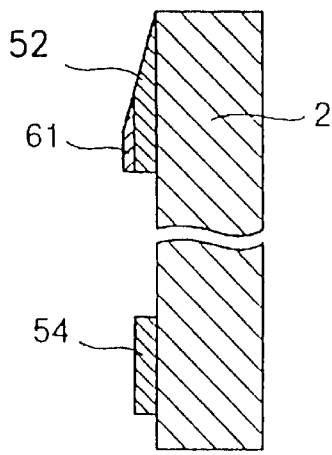
FIG.1c
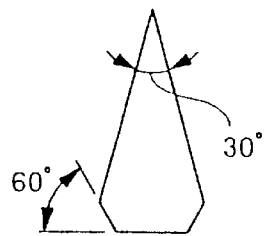

FIG.15
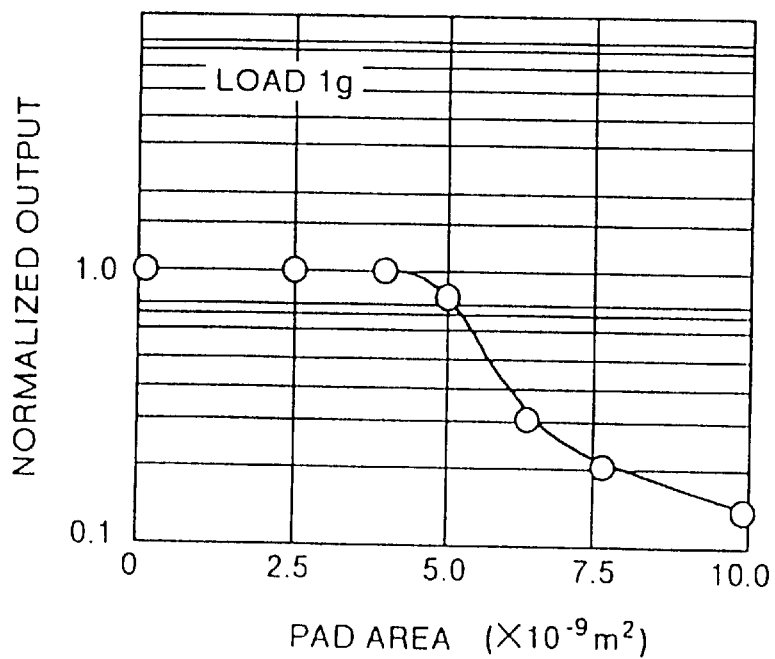
FIG.16a  FIG.16b
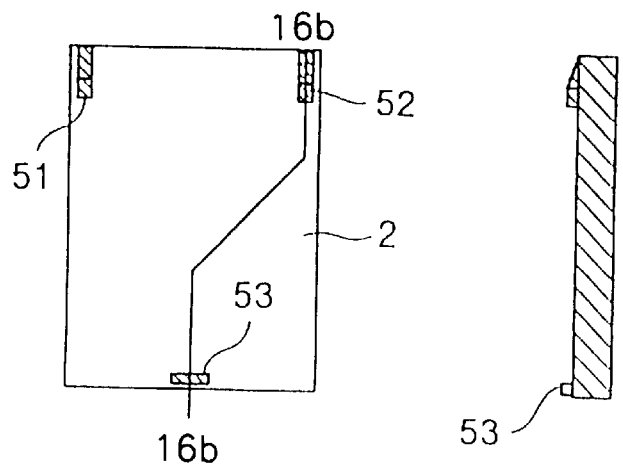
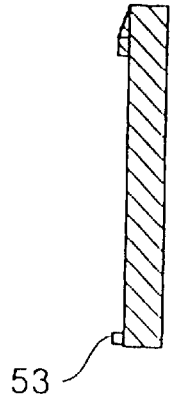
FIG.16c
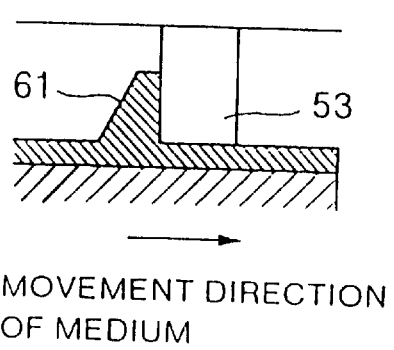
MOVEMENT DIRECTION
OF MEDIUM

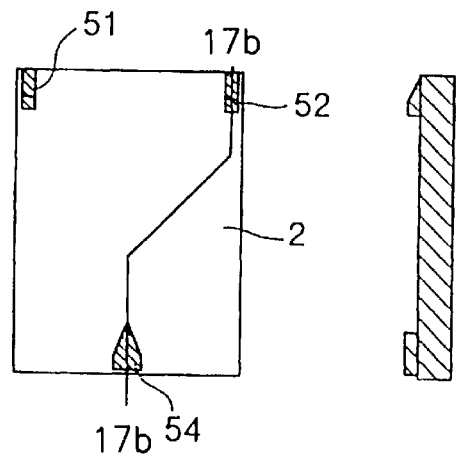
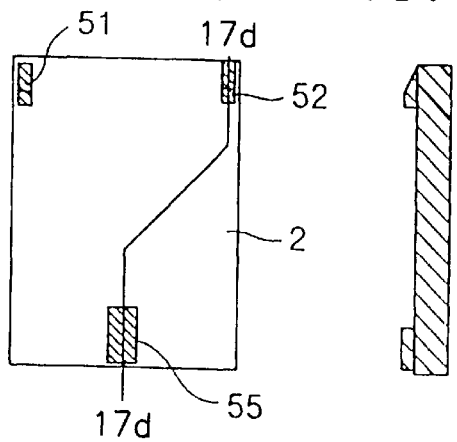
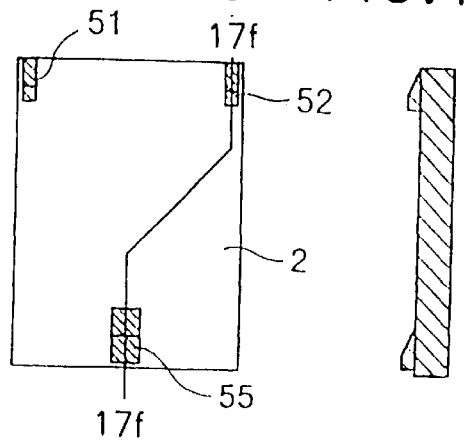

- ANTI-FERROMAGNETISM LAYER
- MAGNETIC LAYER
- NON-MAGNETIC LAYER
- MAGNETIC LAYER
- BUFFER LAYER
- BASE

MAGNETIC HEAD AND SLIDER CONFIGURATION FOR CONTACT RECORDING HAVING A PLURALITY OF TAPERED SURFACES

BACKGROUND OF THE INVENTION

Information processing apparatuses employ, as their storage apparatus, chiefly semiconductor memory and magnetic memory. The semiconductor memory is used as an internal storage apparatus because of its short access time, and the magnetic memory is used as an external storage apparatus because of its large storage capacity and non-volatility. Two major types of magnetic storage, a magnetic disk and a magnetic tape, are today in widespread use, in which a magnetic thin film formed on an aluminum disk or resin tape is used as a recording medium. To record magnetic information onto the recording medium, a functional component performing electromagnetic conversion operation is used. To reproduced the magnetic information once recorded, another functional component performing magnetoresistive or giant mnagnetoresistive phenomenon or electro-magnetic induction phenomenon is used. These functional components are arranged in an input/output unit called a magnetic head.

The magnetic head moves relative to the recording medium, to record magnetic information at any particular location on the recording medium and to reproduce, as required, the magnetic information recorded. A magnetic disk unit is now discussed for illustration purpose. As shown in FIG. 2, a magnetic head is made up of a recording component 21 for recording magnetic information and a reproducing component 22 for reproducing magnetic information. The recording component 21 is made up of a coil 26 and magnetic poles 27, 28 which wrap the coil 26 at its top and bottom and which are magnetically coupled. The reproducing component 22 is made up of a magnetoresistive effect pickup 23 and a conductor 29 for conducting a constant current to the pickup 23 and for detecting a resistance change. Disposed underneath the reproducing component 22 is a magnetic shield layer 25 which prevents intrusion of unwanted magnetic flux. The pole 28 has the same magnetic shielding effect. The narrower the so-called read gap, namely the clearance between the magnetic pole 28 and the shield layer 25, the less unwanted magnetic flux intrudes into the magnetoresistance effect pickup 23, the better discrimination results and therefore the more high-density magnetic information is handled. These functional components 21, 22 are formed on a primary layer 24 on top of a magnetic head body 30.

The performance of a magnetic storage apparatus is determined by the speed of input/output operation and its storage capacity, and to enhance the performance of the magnetic storage apparatus, a short access time and a large storage capacity should be achieved. There is today a growing demand for a compact magnetic storage apparatus from the standpoint of space saving and ease of use. To meet such a demand, a magnetic storage apparatus capable of recording and reproducing a great deal of magnetic information to and from a sheet of recording medium should be developed. A known example is disclosed in The Journal of The Magnetics Society of Japan, Issue 18, No. 51, page 345. FIG. 18 shows its structure. A magnetoresistive effect pickup 23, interposed between shield films 42, 25, has an electrical contact point with the shield film 42. Thus, the shield film 42 is also used as a conductor. The above disclosure is the prior art in that the direction of current to the magnetoresistive effect pickup 23 is perpendicular to the sliding surface. A conductor 47 is used to control the direction of magnetization of the magnetoresistive effect pickup 23 when a current flows. In the present invention, the conductor 47 is also required, and is disposed between the write magnetic poles. In FIG. 18, however, contact between the magnetoresistive effect pickup 23 and the shield film 42 is performed by an area contact, where magnetoresistive effect is degraded by magnetostriction that takes place in the magnetic thin film because of machining deformation residing after formation of the magnetic poles. It was also learned that Cu as a material for electrodes diffusing through an NiFe layer degraded its magnetic characteristic. In the contact point that is subject to such a problem, intended magnetoresistive effect fails to work satisfactorily and high-sensitivity pickup required for high-density recording cannot be achieved.

To attain a high-density recording, the size of magnetic domains should be miniaturized. Generally speaking, this objective may be attained by narrowing the width w of the recording pole 27 shown in FIG. 2 and by heightening the frequency of the recording current flowing into the coil 26 (frequency against the rotation of the recording medium). Since the signal strength during reproduction depends on the size of the magnetic domains, a miniaturized magnetic domain lowers the resulting signal strength, presenting difficulty in the reproduction of information. Thus, a provision should be made to enhance pickup sensitivity of the reproducing component. However, improvements attainable in this approach are subject to a limitation of physical restriction of magnetoresistance effect presented by a magnetic thin film used in pickup. The limitation of the recording density now widely accepted is a few $Gb/in^2$.

To overcome this limitation, for example, U.S. Pat. No. 5,041,932 has proposed an integrated magnetic read-write head/flexure/conductor structure where a magnetic head and a recording medium are put into contact. In the conventional magnetic disk device, its magnetic head is airborne on the recording medium, and a layer of air is interposed between the magnetic head and the recording medium. In contrast, the disclosure of the above U.S. Patent employs a magnetic head functional component 43, as shown in FIG. 3, that is embedded into a light-weight, miniature flexure 45, and the magnetic head functional component 43 is slid while being kept in contact with the recording medium 11. Since in the above disclosure, non-magnetic layer is interposed between the surface of the recording medium and the magnetic head functional component (magnetic poles) 43, magnetic information in the recording medium is efficiently transmitted to the magnetic head functional component, and a strong reproduction signal thus results. A magnetic domain, even when miniaturized, offers a high signal to noise (S/N) ratio, and an excellent reproduction signal results.

Since in the above arrangement, however, the magnetic head functional component is supported by a flexible flexure, the deformation of the flexure causes a phase delay or unexpected vibrations when a rotary actuator performs the positioning of the magnetic head.

This problem may be alleviated by a magnetic head 2 that lifts a front pad, as shown in FIG. 4 (Japanese Patent Unexamined Publication No. 6-60329). In this arrangement, the front pad flies or floats high by means of air pressure, and only a rear pad having a device functional component 46 remains in contact with a recording medium 1. With the front pad floated, the load acting on one rear pad is reduced to the load of the magnetic head minus flying force. Reducing the load acting on the rear pad permits the load acting on the entire magnetic head to increase accordingly. If a larger load is permitted on the entire magnetic head, rigidity of suspension members and the like for supporting the magnetic head will be increased. Thus, a reliable input/output operation is assured compared to the mechanism of the magnetic head supported by the flexure.

However, the magnetic head must be kept light. For example, Japanese Patent Unexamined Publication No. 5-114116 requires the entire magnetic head to be 1.5 mg or lighter.

As described above, the usual technique allows magnetic information to be recorded and then reproduced in a high density with the magnetic head keeping contact sliding with the recording medium. However, it is learned that a further attempt to increase the recording density presents the following problem.

Since the front pad is afloat, the front side of the magnetic head floats greatly as the recording medium rotates at its high circumferential speed region, and as shown in FIG. 4, the clearance a between the poles constituting the device 46 and the surface of the recording medium 1 is made larger. This broadens a recording magnetic field distribution, a resulting spacing loss degrades electromagnetic conversion efficiency in reproduction, and intended high-density information cannot be input nor output.

To keep the magnetic head in the position shown in FIG. 4, the front pad size should be large. When the recording medium comes to a halt, the front pad of the magnetic head that was afloat is put down into contact with the surface of the recording medium. If the front pad size is large, the front pad is subject to stick because of a lubricant existing between the pads and the recording medium. Stick results from cohesive force, adhesive force, and surface tension of the lubricant filled between the pads and the recording medium, and is so strong that simply rotating of the recording medium may not separate again the pads from the recording medium. Any attempt to forcibly rotate the recording medium with the pads stuck thereon may cause damage such as a damaged suspension system of the magnetic head or a peeled magnetic thin film that forms the recording medium.

To prevent stick, Japanese Patent Unexamined Publication No. 6-44718 discloses a magnetic head that has, on its sliding surface, a strut having a small contact area. Disadvantages with this disclosed arrangement are that the manufacturing steps of the strut is more complex than those of ordinary components, and that the strut contacts the medium during low floating (contact sliding) operation.

U.S. Pat. No. 5,424,888 discloses another arrangement, in which stick is prevented by tapering the front pad and the rear pad of a magnetic head. Since the purpose of this arrangement is to help float of the magnetic head while preventing stick, the tapered pad is never put into contact with the recording medium during recording and reproduction. To test the adaptability of this magnetic head to a high-density recording medium, a recording and reproduction test was performed with the pad kept in contact with the recording medium. Test result was to provide a poor reproduction signal. This is because the pad area in contact with the recording medium is large enough to give a large tangential force (frictional force) and to force the magnetic head to vibrate.

Further, to keep the magnetic head in the position shown in FIG. 4, the flying force of the front pad should be balanced with rigidity of the gimbal member of the suspension system for supporting the magnetic head. Beside keeping the magnetic head in its position, the gimbal member absorbs machining tolerances and assembly tolerances of the magnetic head, the suspension system and arm members taking place when they are machined and assembled, so that the surface of the pad on which the device is mounted is put into contact with the surface of the recording medium.

In a magnetic storage apparatus that allows its magnetic head to be in contact with its recording medium, the magnetic head should be lightly weighted to lessen abrasion of the magnetic head and recording medium and to prolong the life of the apparatus. To mate the pad surface with the surface of the recording medium under such a light load condition, the suspension system should have an extremely low-rigidity gimbal. Suspension systems now available at an inexpensive price are made typically of stainless steel. We the inventors have learned that an intended rigidity is difficult to achieve, considering that wiring for a device should be installed on the gimbal section of the suspension system and that the gimbal needs manufacturing through metal stamping process that is suitable for quantity production.

Further, the shape of a magnetic head sliding surface is described in Japanese Patent Unexamined Publication Nos. 6-60329 and 6-150283, for example. These heads disclosed assured a stable and continuous contact sliding within a limited range of yawing angle. The following problem, however, arose when a contact sliding test was performed within the yawing angle specified in our invention. FIG. 14 shows the test result of each prior art head in connection with the relationship between the yawing angle and the output of the magnetic head. FIG. 14a shows the test result obtained from the magnetic head made up of the pads 51-a, 52-a, and 53-a according to Japanese Patent Unexamined Publication Nos. 6-60329 and 6-150283, and FIG. 14b shows the test result obtained from the magnetic head made up of the pads 51-b, 52-b, and 53b according to Japanese Patent Unexamined Publication No. 6-150283. A high output level (namely, a good output) was obtained only within a yawing angle of ±10° in FIG. 14a or within a yawing angle of ±15° in FIG. 14b. These disclosed examples thus failed to satisfy the performance requirement our invention meets in achieving a reliable input/output operation over a wide range of yawing angle. After studying the examples, we learned that the magnetic head when the yawing angle was set to ±15° or more. The above disclosures did not address this problem, and this embodiment is the first one that focuses on this problem. To attain a large storage capacity in a magnetic storage apparatus, the surface of the recording medium should be effectively utilized. This objective cannot be achieved by these disclosed prior techniques only.

Japanese Patent Unexamined Publication No. 6-60329 discloses a three-pad type magnetic head with its front pads floated. In this case, however, the front pads float high by air pressure (as high as 50 nm), and if the circumferential speed varies greatly, the flying force varies as well, making unstable the contact sliding operation (thus, input/output operation). The problem encountered herein agrees with the problem presented in FIGS. 14a and 14b. In the shape of the pads in our invention, excess lubricant is reliably rejected without floating or flying the front pads 51, 52. Therefore, a reliable input/output operation was achieved within a wide range of yawing angle.

Other examples that employ a sharpened pad on a sliding surface are disclosed in Japanese Patent Unexamined Publication Nos. 4-281209, 1-298585, 6-52645, and 2-101688. Since these are of a flying head, the pad should generate flying force. For this purpose, the pad area should be large, and the same pad obviously fails to serve the purpose of the present invention where the head remains in contact with the medium. According to the test, the pad area should be less than $2.5 \times 10^{-8} m^2$ to prevent the pad from flying. To embody the present invention, therefore, the pad size should be restricted.

In the pad disclosed in U.S. Pat. No. 5,424,888 having its taper on its entire surface, the pad surface comes close to the surface of the recording medium as shown in FIG. 24a. Since a pad surface 83 formed on the pad 53 is a flat plane, a sharp edge comes close to surface of the recording medium. The magnetic head was put into contact sliding in such a position relative to the recording medium, the sharp edge portion was rapidly abraded. When abrasion advanced, a new surface was formed generating a flying force larger than originally calculated in design stage. This made it impossible to keep the contact engagement between the magnetic head and the recording medium at the value originally intended at design stage. Furthermore, abrasion induced a great deal of powder, leading to a serious crash problem.

For the above reasons, the pad area for floating the magnetic head cannot be made small, the problem of stick cannot be solved, and thus the magnetic storage apparatus having a floating front pad is subject to a limitation in an effort of high-density recording design.

It is an object of the present invention to provide a novel magnetic head that constantly allows itself to be in contact with a recording medium and to provide a magnetic storage apparatus of low-price, large storage capacity and high recording density employing the magnetic head.

SUMMARY OF THE INVENTION

According to the present invention, a plurality of pads are provided on the sliding surface of a magnetic head, the pads positioned to the front side of the magnetic head is tapered toward their front ends and the front pad is higher than the rear pad. The difference in height between the pads is easily introduced by selectively forming a thin film on the front pads, and a dual-taper relative to the surface of the recording medium are automatically formed on the magnetic head. Since a plurality of magnetic heads can be processed in this method at a time, it is easily adaptable to quantity production. By constructing the thin film layer of carbon as its chief constituent, abrasion arising from sliding with the surface of the recording medium can be slowed.

Preferably, three pads are arranged, two pads on the front side and one pad on the rear side of the magnetic head, and a recording component and a reproducing component are mounted on the rear pad.

The sum area of the pads on their sliding surface is set to be within a range of 0.0003 to 0.02 $mm^2$. Experimentally, it was found that the magnetic head floated over the recording medium when the sum area of the pads exceeded 0.02 $mm^2$ with a load of the magnetic head being 1 g. The pad area contributing to the floating of the magnetic head was also determined by the load of the magnetic head; with a load of 200 mg, the magnetic head floated when the pad area was 0.012 $mm^2$. When the pad area was reduced below 0.0003 $mm^2$, a stable continuous contact sliding was not attained because the pads were deformed by tangential force even with a load of 10 mg. Based on these test results, the pad area is set to be within a range of 0.0003 to 0.002 $mm^2$ in our invention.

The center of support of the magnetic head was set to be off the center of gravity of the magnetic head but to lie on the line that connects the center of gravity of the magnetic head to the center of the rear pad. This arrangement reduces the torque acting on the rear pad when the recording medium rotates. As a result, the rear pad is prevented from floating.

In the apparatus of a type that allows a magnetic head to be in contact sliding with a recording medium, abrasion that takes place between the magnetic head and the recording medium should be slowed as much as possible to prolong the life of the apparatus. To this end, the cross section of a lamination film that is made of carbon as its chief constituent is exposed to the surface of the rear pad. The lamination film is aligned in parallel with the plane of the side surface of the magnetic head where a device for inputting and outputting magnetic information is formed, and is manufactured before and after the manufacturing steps of the device. When the magnetic head is sliding, carbon based material that exhibits excellent abrasion resistance is in contact with the recording medium. Abrasion of the pads is thus substantially slowed.

It is known that the abrasion is also determined by load, and in the present invention, the abrasion is further controlled by optimizing the load of the magnetic head. Specifically, the load of the magnetic head is set to be within a range of 10 mg to 1 g.

FIG. 5a shows the experimentally determined relationship of the load of the magnetic head with the resulting frictional force (tangential force: resisting force taking place when the magnetic head slides on the lubricant) in sliding action. In the tapered pads in FIG. 5, the magnetic head has pad layout shown in FIG. 1, the sum area of the pads is 0.02 $mm^2$ (the area of one front pad is 0.0025 $mm^2$), and the rear pad is coated with a 3 $\mu m$ thick carbon film. In the plane pads in FIG. 5, the magnetic head is identical to the magnetic head of the tapered pads in pad layout but is different in that the front pads are in the same plane as the rear pad.

As seen from FIG. 5a, the frictional force taking place in sliding depends on the load of the magnetic head, and beyond a load of 1 g, the rate of change of frictional force changes. This phenomenon is considered to be related to the resistance characteristic of a lubricant layer. Also as seen from FIG. 5a, the frictional force depends on the shape of the pads, and the tapered pads of the present invention offer a lower frictional force than the plane pads of the usual technique. To support the magnetic head stably, the smaller frictional force is better. The tapered pads are thus found to be effective.

Friction coefficient is determined by dividing a frictional force by a load. FIG. 5b shows the relationship of the load and the friction coefficient, which is derived from FIG. 5a. The friction coefficient affects abrasion, and the smaller the friction coefficient, the longer the life of the apparatus. As seen from FIG. 5b, the load of the magnetic head within a rang of 10 mg to 1 g is preferred, because it keeps the friction coefficient small. In the range of load less than 10 mg, frictional force overwhelms the load making the position of the magnetic head unstable. It is considered that resistance arising from the lubricant becomes dominant in the frictional force.

The recording medium is constructed, at least, of a recording layer for magnetic information, a protection layer laminated on the recording layer and made of a carbon film or carbon-silicon carbide mixed film as its chief constituent, a bonding lubricant layer that reacts with and bonds with the material of the protection layer, and a free lubricant layer having flowability and disposed on top of the bonding lubricant layer. As the material of the base of the recording medium, known materials such as Al, Si, glass, carbon, and polymer may be employed.

In the magnetic head of the present invention, all the pads are kept in contact sliding on the recording medium without floating off the recording medium, by providing dual tapers on pads, minimizing the sum area of the pads, setting the center of support properly, and optimizing the load of the magnetic head, with the aid from the gimbal of the suspension system for supporting the magnetic head.

Since, according to the present invention, there is no need to float the front pads, in other words, generation of flying force is not needed at the front pads, the front pad area can be reduced within the limits where no stick takes place. As shown in FIG. 6, the front pads 52 that are dual-tapered are higher than the rear pad 54, and thus the magnetic head is raised at its front side, causing itself to be tilted relative to the recording medium. Since the substrate surface of the magnetic head and the surfaces of the pads are in parallel, the surfaces of the pads 52, 54 are tilted relative to the surface of the recording medium 1, by making the height of the front pads and the height of the rear pad different. The front pads are dual-tapered with two differently tapered surfaces. This arrangement allows the magnetic head to contact the surface of the recording medium substantially by line rather than by area even when the lubricant exists on the surface of the recording medium. With the recording medium 1 rotated at the condition shown in FIG. 6, a lubricant layer 63 existing on the surface of the recording medium is efficiently raked up into the sliding surface of the magnetic head and is prevented from clogging at the front edges of the pads 54, 52.

The technique of coating the front side with a thin film and tapering a plurality of pads is disclosed in the above cited U.S. Pat. No. 5,424,888.

The present invention and the above disclosure have in common a part of the process of coating a front pad with a thin film.

Since the above disclosure is related to the floating head in which a flying distance does not depend on a circumferential speed of the recording medium, the disclosed technique, as it is, is not adaptable to the contact sliding magnetic head that is the object of the present invention.

The problems associated above will be discussed as follows.

It is well known that when a magnetic disk device is manufactured, error factors such as assembly tolerance cause the device to be assembled with the difference from original design values.

To make the magnetic disk device function, the magnetic head should be pressed onto the recording medium at a predetermined load, and the load is naturally subject to an error introduced during assembly.

That the flying distance does not depend on the circumferential speed means that the flying force is constant even when the circumferential speed varies. This suggests that when the load of the magnetic head varies due to tolerances and the like, the flying distance varies as well.

To keep continuously the magnetic head of this nature in contact with the recording medium, a larger force (load) greater than the flying force should be exerted onto the magnetic head against the recording medium.

The problem is that a load variation arising from machining and assembly tolerances goes uncompensated because the flying force is constant.

If the load pressed against the recording medium is uncompensated, the lubricant will be peeled off the surface of the recording medium, causing failures such as crashes and rapid abrasion and possibly leading to a short service life of the apparatus.

To prevent such failures, the load should be controlled so that it is larger by a slight force (on the order of a few mg) than the constant flying force.

It is obvious that such a control is virtually impossible in the known assembly method, and there is no known technique to cope with this control.

In the conventional floating head, if the load after assembly is greater than the design value, the position of the head changes. The positional change works in the direction the flying force increases, thereby balancing with the load.

According to the present invention, dual tapers provided at the front pads allow the lubricant to be efficiently raked up. With the load varying, the reaction force from the lubricant varies so as to be able to compensate for the variation of the load.

The above cited disclosure states that the taper angle of the front pads is set to be small to keep the flying force constant against the circumferential speed.

If a single taper is provided and its angle is small, no high efficiency results in the raking of the lubricant. The quantity of the lubricant raked up remains small and thus unable to compensate for variations in load.

It was also learned that a single and small-angled taper increased only frictional force (tangential force) in contact sliding.

FIG. 22 shows qualitative measurement results of such force, namely the force required to start contact sliding with the thickness of the lubricant as a parameter.

As shown in the figures, test results obtained from the magnetic head of the above-cited disclosure and the magnetic head of the present invention with both magnetic heads in contact sliding are compared with each other.

As seen from FIG. 22, the recording medium of the present invention presents a smaller initial frictional force (stick force) over the entire range of the lubricant thickness measured.

An increase in frictional force is undesirable from the standpoint of keeping reliably the magnetic head in its position and presents difficulty achieving contact sliding.

The technique of the above-cited disclosure achieves the slow speed features of lift-off and lift-down actions and is intended strictly for use as a flying head.

For this reason, the above-cited disclosure fails to go further in describing a technique for achieving contact sliding.

According to the present invention, the front pads have dual tapers which minimizes the pad area in contact with the lubricant, and this reduces the initial frictional force.

The above arrangement also allows the lubricant to be raked in a high efficient manner, and the resulting reaction force makes it possible to keep the magnetic head in contact sliding on the recording medium with the variation of the load absorbed.

With the front pads not flying, the position (tilt) of the magnetic head remains unrelated to the circumferential speed of the recording medium. Therefore, the clearance α between the magnetic poles that constitute the element 46 in FIG. 4 and the surface of the recording medium 1 remains constant, and the recording magnetic field is kept in a sharp distribution, so that high-density information can thus be input and output.

Consideration to the moment related to the flying force is unnecessary in the design of the suspension system that supports the magnetic head. The suspension system is perfectly acceptable if it has a function of absorbing the component-level machining and assembly tolerances (namely a function of mating the pad surface on which the device is mounted, with the surface of the recording medium). The suspension system is provided with a larger margin in its design and is thus manufactured at a reduced cost.

Since there is no need to offset the flying force, rigidity of the suspension system is reduced and the load of the magnetic head is lowered. Specifically, the load of the magnetic head is set to be 1 g or lighter. As a result, the abrasion of the recording medium is reduced, and the life of the apparatus is prolonged. By setting the load of the magnetic head to within a range of 10 mg to 1 g, its abrasion is minimized to a negligibly low level. Although the apparatus is of a type in which the magnetic head is continuously in contact sliding on the recording medium, its life is prolonged to be as long as that of the conventional magnetic disk that uses the magnetic head floats off the surface of the recording medium.

Since there is no need to float the magnetic head off the recording medium in our invention, Al, glass and Si and even carbon and polymer (plastic) that tend to suffer a slight degree of undulation are acceptable as the material of the base for the recording medium. If the recording medium is constructed, at least, of a recording layer formed on the base for magnetic information, a protection layer laminated on the recording layer and made of a carbon film or carbon-silicon carbide mixed film as its chief constituent, a bonding lubricant layer that reacts with and bonds with the material of the protection layer, and a free lubricant layer disposed on top of the bonding lubricant layer, the free lubricant layer moves along the pads as the magnetic head moves, and thus the pads slide on the bonding lubricant layer. In this case, even if contact with the pads breaks the bonding lubricant layer, the lubricant layer having a fluidity fills the breaks of the bonding lubricant layer one after another, thereby enabling to prolong the life of the apparatus.

BRIEF DESCRIPTION OF THE DRAWINGS

FIGS. 1a, 1b, and 1c are schematic views of sliding surfaces and cross sections of the magnetic head.

FIG. 15 is a diagram showing the relationship between the pad area and its output.

FIG. 16 is an explanatory view of rectangular pads and their problem.

FIGS. 17a, 17b, and 17c are views showing the configuration of the novel pads employed in our invention.

DETAILED DESCRIPTION OF THE PREFERRED EMBODIMENTS

Embodiment 1

Figure 2:
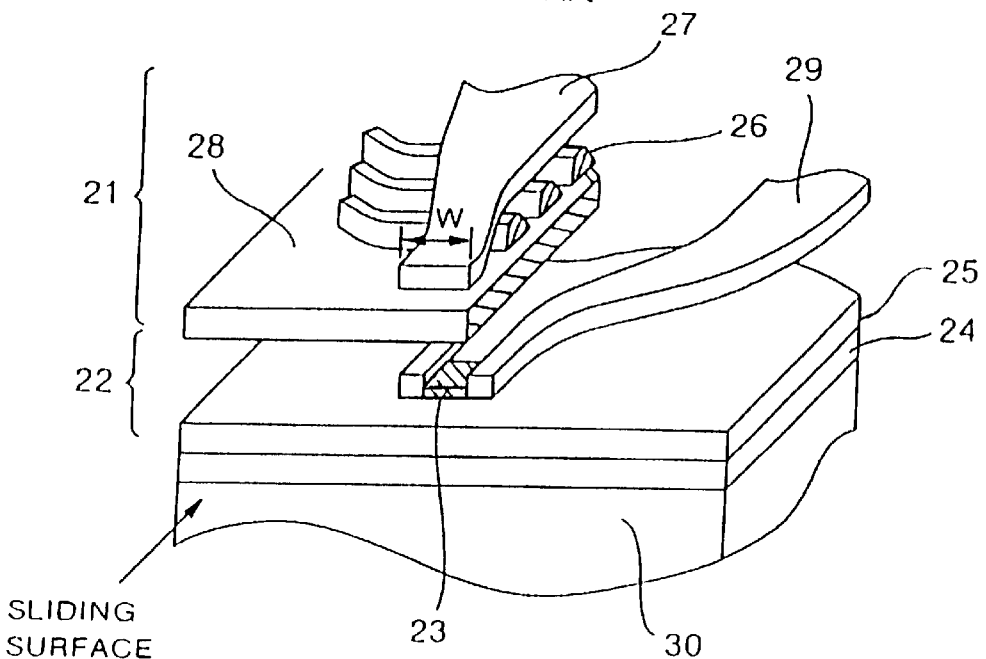
FIG. 2 is a perspective view of a recording/reproduction separate type magnetic head.
Figure 3:
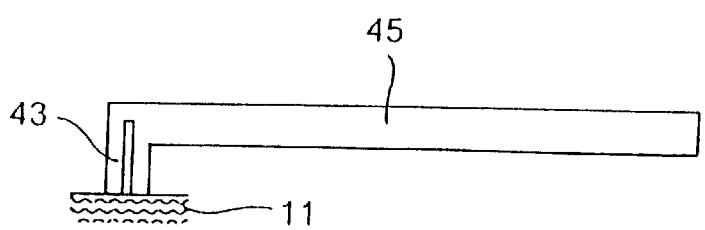
FIG. 3 is an explanatory view of the conventional magnetic head having a device in its flexure.

Referring now to the drawings, the embodiments of the present invention will be described. FIG. 1 shows an example of magnetic head used in the magnetic storage apparatus according to the present invention. FIG. 1a is a bottom view of the magnetic head, along with its cross-sectional view taken along the line A—A'. FIG. 1b is an enlarged cross-sectional view of the pads. FIG. 1c shows an example of the configuration of the rear pad.

The magnetic head 2 is constructed of a substrate of hard AlTi carbide or the like. As shown in FIG. 1a, the sliding surface of the magnetic head 2 has on its inlet side, namely on its front side, pads 51, 52, and on its outlet side, namely, on its rear side, a pad 54. A functional component for performing recording and reproduction having the construction shown in FIG. 2 is mounted on the rear pad 54.

Figure 6:
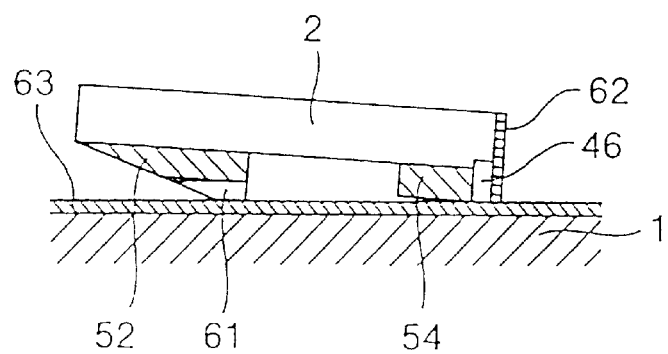
FIG. 6 is an illustration of the magnetic head of the present invention with the position thereof.

In order to slow abrasion of the pad 54, the cross-section of the carbon layer of the pad 54 on which the functional component is mounted is exposed to the surface of the pad 54. To this end, a carbon layer of about 1 µm thick is deposited beneath a primary layer 24 in the manufacturing process for the structure of the device shown in FIG. 2. Specifically, as shown diagrammatically in FIG. 6, the surface of the rear pad 54 on which the component 46 for inputting and outputting magnetic information is constituted by the cross-section of a deposition layer 62 having carbon as its main constituent.

The device thus constructed is polished to provide a sliding surface, to which the carbon layer is exposed. Since the carbon layer is mechanically strong and exhibits an excellent abrasion resistance, the device mounted pad 54 is also resistant to abrasion. A similar effect will be equally expected if the primary layer 24 itself is formed of a carbon layer or if a carbon layer is additionally formed on an insulating layer that is coated on top of an upper magnetic pole 27.

Ion milling or other machining techniques was used to machine the pads, and the etch depth was about 20 $\mu$m. The front pads 51, 52 were tapered at an angle of 0.1° through 1° to its front edge, and the plane portion of each front pad in parallel with the substrate was 50 $\mu$m by 50 $\mu$m wide. The sum area of both pads is $5.0 \times 10^{-9}$ m$^2$. The present invention does not require that the front pads be tapered linearly. Alternatively, a chamfer may be formed by polishing the pads. We verified that the chamfer formed on the front pads during machining may also be worked. The flying force generated by the pads 51, 52 were so small that we were able to neglect it. As shown in FIG. 1a, the rear pad 54 is a symmetrical, elongated pentagon having a base of 150 $\mu$m across and an altitude of 300 $\mu$m high, and is sharply angled toward the front side. The front pads 51, 52 are spaced from the rear pad 54 by 1.8 mm. We verified that, instead of the pentagon shown, a pad 54 of a deformed pentagon as shown in FIG. 1c, rectangular, inverted trapezoid, or circular shape worked equally.

The rear pad 54 provided with the device was entirely covered with a resin that had solubility in a solvent, after three pads 51, 52, and 54 were formed. After that, the sliding surface of the magnetic head was coated with a carbon layer using sputtering or CVD (Chemical Vapor Deposition) techniques. The thickness of the carbon layer was calculated from the tilt angle of the magnetic head of interest and the distance between the pads 51, 52 and the pad 54. In this embodiment, the tilt angle was 1 mrad, and the thickness of the carbon layer was approximately 1.0 $\mu$m. After the magnetic head was coated with the carbon layer, the predetermined solvent was used to remove the resin cover of the pad 54. In this case, the carbon layer on the resin was removed together, and as a result, the carbon layer 61 remained on the pads 51, 52 only. This process made the pads 51, 52 higher than the pad 54 by 1.0 $\mu$m.

A similar effect may be achieved if a hard layer of silicon oxide or silicon nitride is used instead of the carbon layer.

After the above process, the magnetic head was covered entirely with a carbon layer of 10 nm thick as a protection layer in the same way as the known magnetic head.

As the front pads 51, 52 were coated with the carbon layer 61, the magnetic head, when put into contact with the recording medium, was tilted resulting in dual tapers with respect to the recording medium. This tilt prevents the lubricant from clogging at the front edge of the pads when the recording medium moves (rotates) and enables a continuous contact sliding in a reliable manner.

Figure 7:
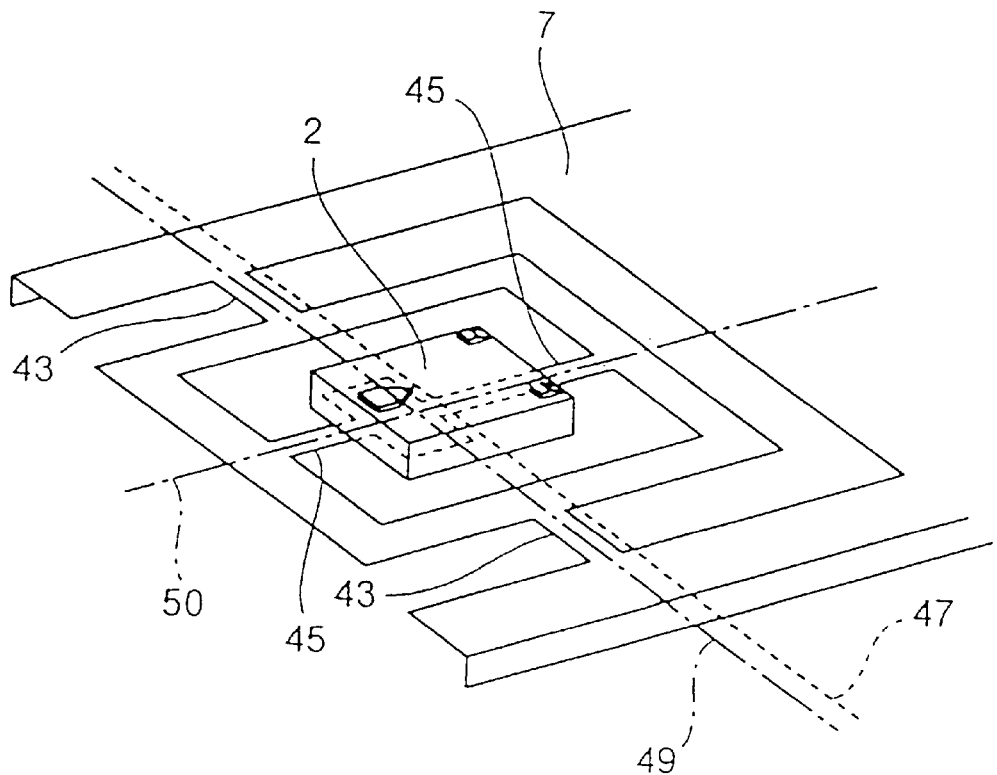
FIG. 7 is an explanatory view of a suspension system.

The magnetic head 2 was supported at its rear side by a suspension system 7 as shown in FIG. 7. The suspension system 7 was produced by stamping from a stainless steel sheet that is about 25 $\mu$m thick, and had cross arms 43, 45 as its gimbal portion. The magnetic head was supported by these cross arms 43, 45. The center of support (load center) of the magnetic head 2 was at the intersection of the center lines 49, 50 of the arms 43, 45. The center of gravity of the magnetic head 2 was at the intersection of a broken line 47 and a dot-dash line 50. Namely, the load center of the magnetic head 2 was set to be off the center of gravity of the magnetic head on the line connecting the center of gravity of the magnetic head to the center of the rear pad. This arrangement helps reduce a torque acting on the rear pad 54 and prevents the rear pad 54 from flying.

Figure 8:
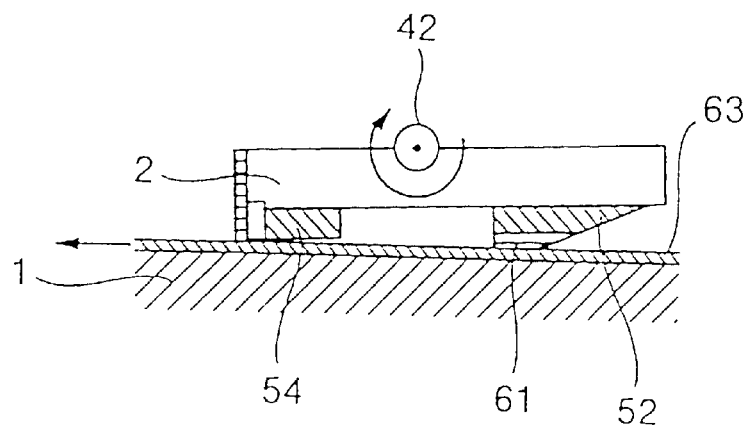
FIG. 8 is an explanatory view of the frictional force acting on the magnetic head.

Referring to FIG. 8, the relationship of the center of gravity of the magnetic head with its load center will be discussed. The magnetic head 2 of the present invention is supported at the center of support 42, and the pads 52, 54 are in contact with the recording medium 1 via the lubricant 63. The frictional force acting on the pads 52, 54 causes a torque about the center of support 42 as a fulcrum. The torque causes the front pad 52 to be lowered and the rear pad 54 having the functional device to be raised from the recording medium. If the device is spaced apart from the recording medium 1, electromagnetic conversion operation is adversely affected, and high-density recording and reproduction are disabled. As already described, in this embodiment, the center of support 47 of the magnetic head 2 lies on the line connecting the center of gravity of the magnetic head to the center of the rear pad, the center of support of the magnetic head 2 is close to the rear pad 54 having the device, and the torque acting on the rear pad 54 is reduced even if a constant frictional force is applied. The floating of the rear pad 54 is thus prevented.

Figure 9A:
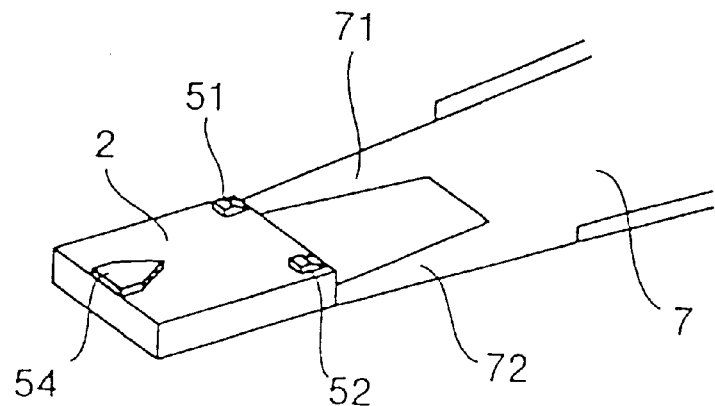
FIGS. 9a and 9b are explanatory views of another example of the suspension system.
Figure 9B:
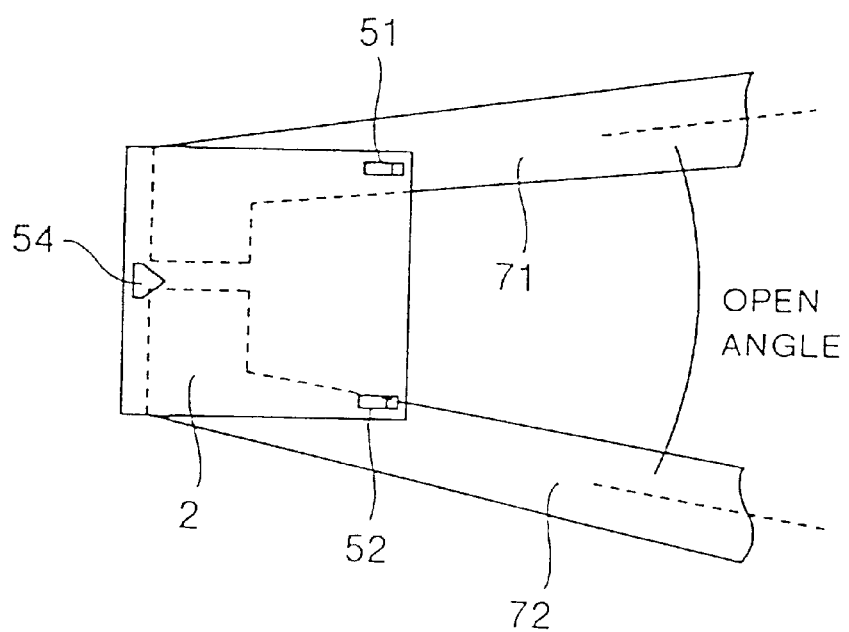

FIG. 9 shows another example of the suspension system. FIG. 9a is the perspective view showing the connection between the magnetic head and the suspension system. FIG. 9b is its bottom view.

The suspension system 7 has at its end two bifurcated leaf springs 71, 72, which support the magnetic head 2 together relative to the pads 51, 52, and 54. Namely, the load from the suspension system 7 is exerted on the support of center that is off the center of gravity of the magnetic head but lies on the line connecting the center of gravity of the magnetic head to the center of the rear pad 54, within an imaginary triangle formed with its three apexes at the three pads. By allowing a predetermined load to act, the floating of the pad 54 is prevented and all three pads are concurrently put into contact with the recording medium. Since two leaf springs 71, 72 can independently deflect, they work as a gimbal. A suspension system having other shapes may be employed as long as it exerts the load at a position away from the center of gravity of the magnetic head and close to the rear pad 54, and it offers a gimballing function.

Figure 10A:
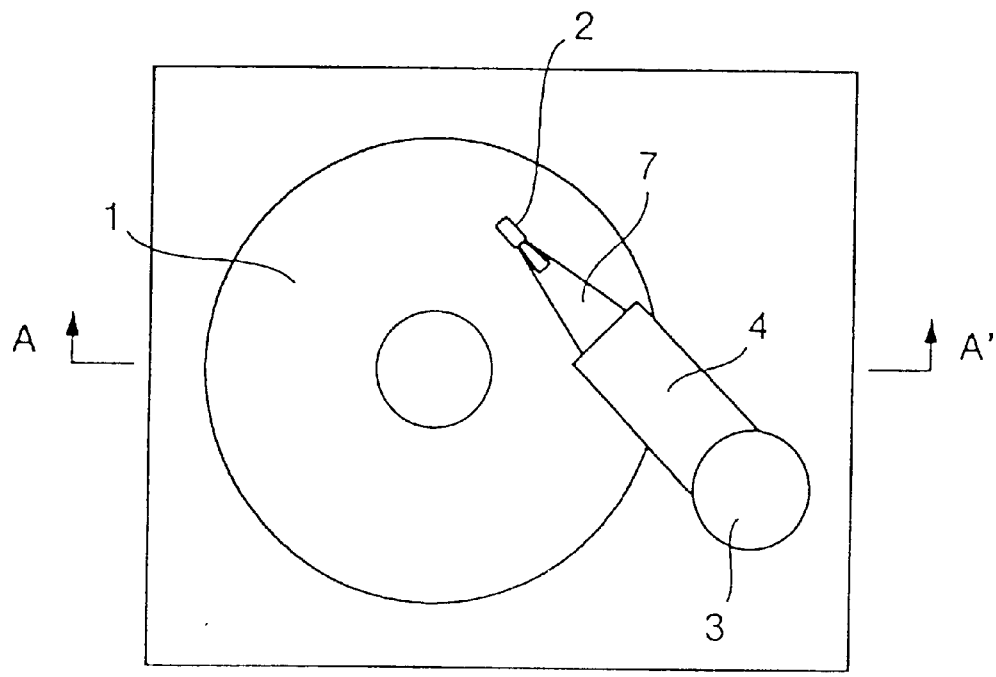
FIGS. 10a and 10b are explanatory views of the magnetic storage apparatus.
Figure 10B:
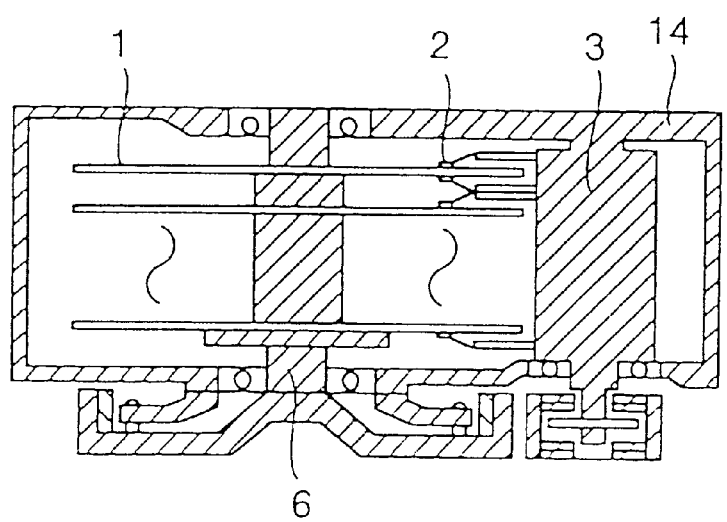

FIG. 10 is the explanatory view showing the magnetic storage apparatus. FIG. 10a is the plan view of the apparatus, and FIG. 10b is the cross-sectional view taken along the line A—A' in FIG. 10a. The recording medium 1 is rotated by a motor 6. The magnetic head 2 having three pads on its sliding surface is supported by the gimbal member attached on the end portion of the suspension system 7. The suspension system 7 is secured to an arm 4 that is driven by a rotary actuator 3, and the rotary actuator 3 moves the magnetic head 2 to a desired position on the recording medium 1. The recording medium 1 employed Al as a material of the base. Also acceptable as the material of the base are glass, Si, and further carbon, plastic and the like. The base was coated with a predetermined recording layer, and then with a carbon layer as a protection layer. A fomblin-based lubricant was then bonded to the protection layer by annealing the lubricant at 120 to 150° C. for a duration of 30 minutes, and further another lubricant of small molecular weight but of the same type or a lubricant having no bonding reactive group was applied. As a result, dual lubricant layers were formed. A silicon containing or a boron containing carbon layer used as the protection layer for the recording medium doubled bonding force. These members are housed in a casing 14.

The apparatus offered approximately 10 GB of storage capacity per recording medium. By stacking a plurality of recording media, a magnetic storage apparatus having a storage capacity of a few tera bytes to a few peta bytes was constructed.

This apparatus of our invention was successfully applied to a magnetic disk device of a type that permitted recording medium interchangeability. In the recording medium interchangeable type disk device, the cost of the recording medium is important, and thus low-cost material for the recording medium, such as glass and plastic, should be employed. According to our invention, a slight degree of undulation on the recording medium is acceptable, because the magnetic head is not floated. Thus, such an inexpensive base successfully works.

Since abrasion that chiefly determines the life of the apparatus greatly depends on the load of the magnetic head, the magnetic head should be pressed against the recording medium at a light load. In this apparatus, the load was set to within a range of 10 mg to 1 g. With the load kept to within this range, a reliable contact sliding was continuously attained, without having to keep the entire magnetic head to 1.5 mg or lighter.

Embodiment 2

As described above, our invention allows high-density magnetic information to be recorded and reproduced with the magnetic head kept continuously in contact sliding with the recording medium. According to our invention, the magnetic head is subject to little flying force, a wider tolerance is allowed in circumferential speed. This allows the magnetic head to move in a wide area on the recording medium. Namely, the magnetic head is movable with a wide yawing angle (an angle between the tangential direction (direction of contact sliding) on the recording medium and the side of the poles for inputting and outputting magnetic information).

Figure 13A:
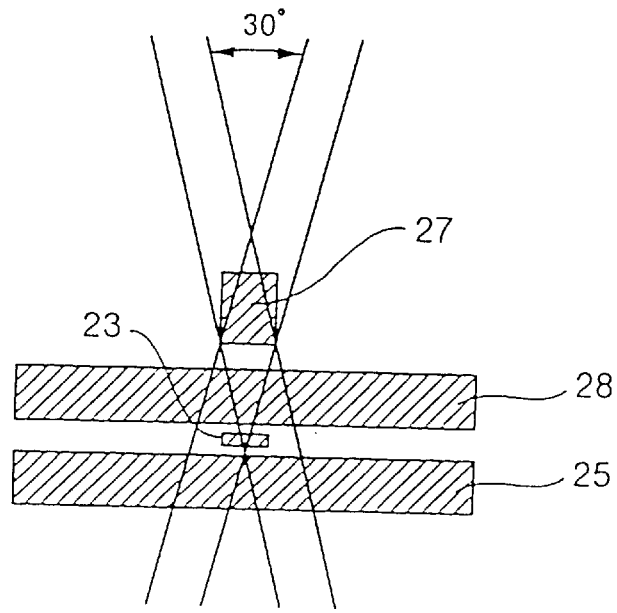
FIGS. 13a and 13b are explanatory views of the structure of the magnetic poles that restrict a yawing angle.

When a magnetic head of a type that has its recording component geometrically separated from its pickup component as shown in FIG. 2 is used, a large yawing angle reduces the width of overlap between recording information row and the pickup component. Referring to FIG. 13a, this is further detailed. FIG. 13a is the explanatory view of the input/output functional component viewed from the sliding surface of the magnetic head. In the magnetic disk device having a storage capacity of 10 Gb/in$^2$, the width of a write pole 27 was approximately 0.8 $\mu$m, and the width of the read magnetoresistance effect pickup 23 was approximately 0.5 $\mu$m. These magnetic thin films were disposed via a shield layer and an insulating layer. Thus, the distance between the write pole 27 and the read magnetic layer 23 was approximately 3.0 $\mu$m in the usual technique. Calculations indicated that, in this positional arrangement, the yawing angle should be to within about ±15° (or within a range of 30°) to cause about 50% of the read magnetoresistance effect pickup 23 to overlap the writing information row (as shown in FIG. 13a). This restriction required that the permitted angle of rotation of the rotary actuator be to within +15°.

Figure 13B:
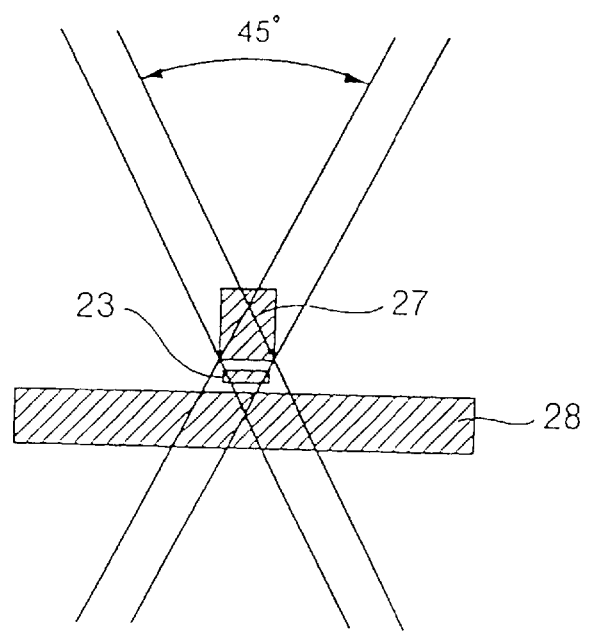

In this embodiment, the read magnetoresistance effect pickup 23 was interposed between two mutually facing write poles 27, 28 as shown in FIG. 13b. In this arrangement, a magnetization transition region generated on the recording medium by writing is kept overlapped on the read magnetic thin film. This arrangement allowed a magnetic field from the magnetization transition region to be efficiently introduced to the magnetic thin film regardless of where the magnetic head is positioned on the recording medium. As a result, a reliable input/output operation was carried out even with a wide yawing angle.

Figure 12:
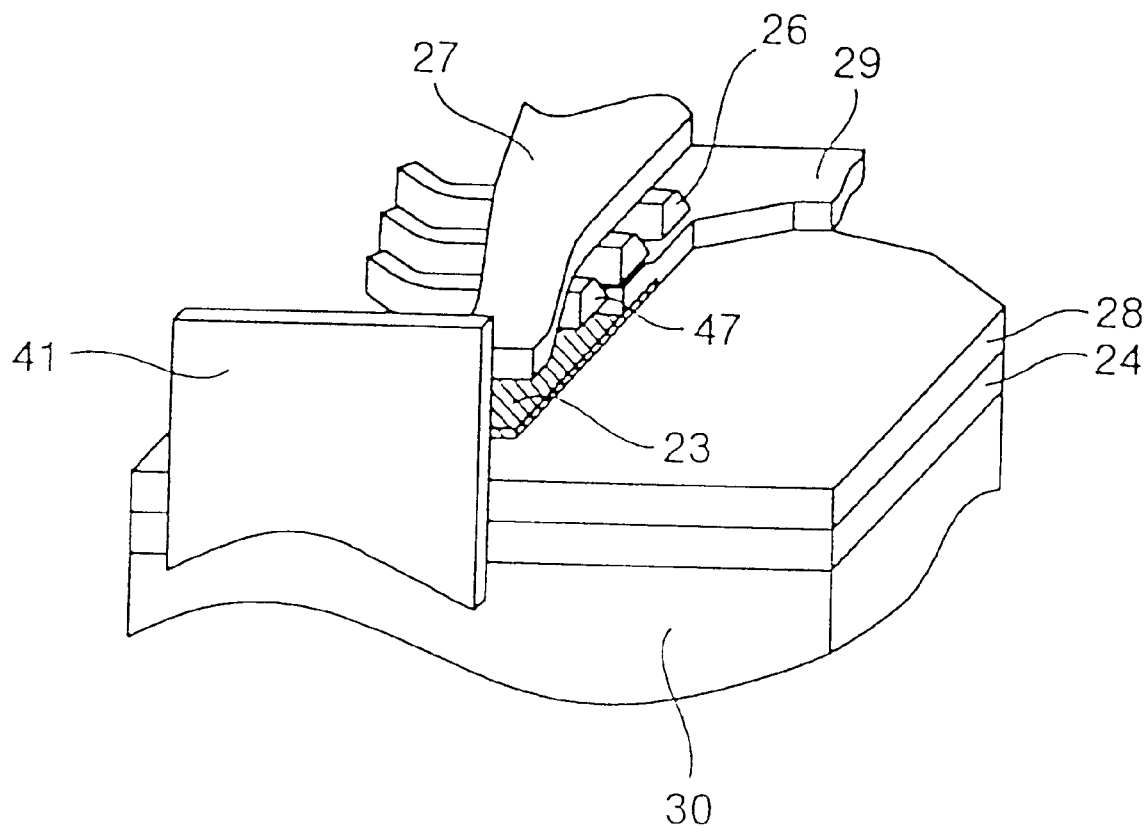
FIG. 12 is a perspective view of a novel magnetic head according to the present invention.

FIG. 12 shows the above arrangement more specifically. The magnetoresistance effect pickup 23 was interposed between the magnetic pole 27 and the bottom magnetic pole 28. The sliding surface of the magnetic head was provided with a conductive film 41, through which the write magnetic poles 27, 28 were electrically coupled with the magnetic thin film 23 having magnetoresistance effect. The operation of this arrangement is discussed below. The magnetic thin film 23 picks up magnetic information using magnetoresistance effect. To this end, a current should be conducted through the magnetic thin film. In the usual technique shown in FIG. 2, a conductor 29 conducts a current to the magnetic thin film 23. In the present invention shown in FIG. 12, the magnetic thin film 23 should be mounted in a place where the write poles 27, 28 are in a smallest clearance (0.5 $\mu$m or less). Disposing the conductor in such a place renders the manufacturing process complicated, and furthermore, the step caused by the conductor is likely to adversely affect the write characteristics of the magnetic head. To cope with this problem, after the magnetic head underwent polishing process in the same way as in the usual technique (after the machining of the sliding surface was completed), the conductive film 41 was applied to the sliding surface. The thickness of the conductive film 41 was 5 nm or so. A conductive carbon film or a metal film made of Ti or the like successfully worked as the conductive film 41. After that, the sliding surface was coated with a hard carbon film to reinforce mechanical strength of the conductive film 41. For this coating, vapor growth technique was employed.

Figure 19:
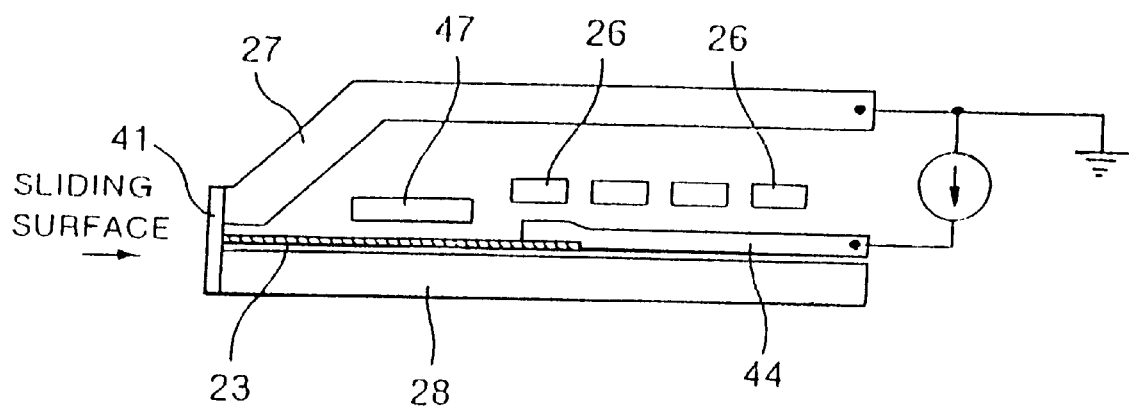
FIG. 19 is a cross-sectional view of a novel head structure employed in the present invention.

The cross-sectional structure obtained from the above process is now discussed referring to FIG. 19. The sliding surface is provided with the conductive film 41, and the magnetoresistive effect pickup 23 (magnetic thin film 23) is interposed between the magnetic poles 27, 28. Since the magnetic poles 27, 28 are put into contact with the magnetoresistive effect pickup 23 via the conductive film 41, the magnetic poles 27, 28 are also used as a conductor. By connecting a conductor 44 to one end of the magnetoresistive effect pickup 23, a current is conducted to the magnetoresistive effect pickup 23. In this case, the area of the electrical contact point at the gap that affects the pickup sensitivity is minimized. According to our invention shown in FIG. 19, the contact area is small, and magnetoresistive effect takes place as intended at the side of the sliding surface where stray magnetic field is usually at a maximum. Our invention thus achieved efficient reading operation at a high recording density condition.

In our invention, the voltage of the conductive film 41 provided on the magnetic head sliding surface in FIG. 19 was set to be equal to the surface voltage of the recording medium. This arrangement removed static electricity during contact sliding and achieved a reliable reading operation.

Figure 20:
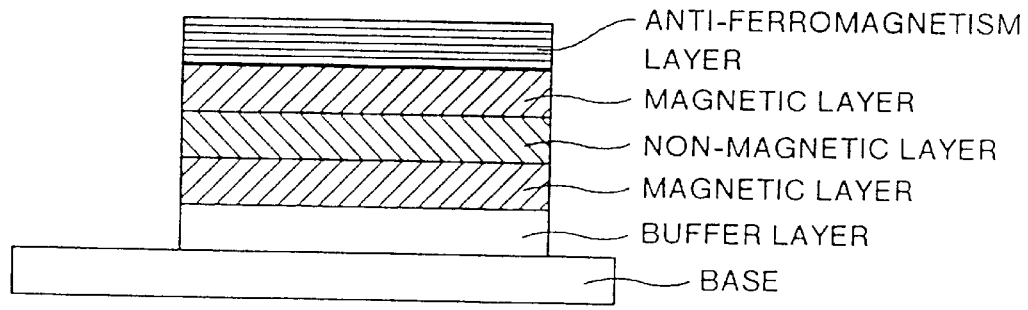
FIG. 20 is a cross-sectional view of a spin valve type magnetoresistance effect pickup.

Our invention was proved adaptable to the spin valve type magnetoresistive effect device shown in FIG. 20. There are a diversity of magnetoresistive effect pickup devices known to those skilled in the art. Since they are in principle of thin film structure, the present invention is adaptable to them without any problem.

The structure of the magnetic head designed to widen the yawing angle has been described. Discussed next is the shape of the sliding surface that is important for widening the yawing angle.

As shown in FIG. 17a, the magnetic head 2 had on its sliding surface the front pads 51, 52 and the rear pad 54 with the read/write functional component, and the rear pad 54 was sharpened in the movement direction of medium. In this arrangement, the lubricant layer resting on the recording medium was adequately raked up into the sliding surface while excess lubricant was rejected on the plane of the recording medium. FIG. 14c shows the test result of the sharpened pad 53-c in connection with the relationship between the yawing angle and the output. As seen from the test result, a reliable and high output level is obtained within a range of ±23°. Compared to the results in FIGS. 14a and 14b, the yawing angle permitted is substantially widened. This effect is attributed to the plane-wide rejection of the excess lubricant.

When the pad 53 with the device has a rectangular shape with its short sides aligned with the contact sliding direction as shown in FIG. 16, the pad 53 clogs, at its front edge, excess lubricant 61 as shown in the right-hand section of FIG. 16. To prevent this clogging, the sliding surface is tilted to rake the lubricant in.

An advantageous effect similar to the one given by the sharpened pad was obtained using a pad 55 that was elongated in the direction of contact sliding as shown in FIG. 17b. It is thought that a longer pad helps itself rake efficiently the lubricant resting on the recording medium into the sliding surface by floating the front pads slightly high (as high as 20 nm).

The same effect was also achieved by tapering a plurality of pads toward their front ends, the pads being constituting the sliding surface of the magnetic head. If the pad 55 is tapered toward its front end as shown in FIG. 17c, the clogging of the lubricant at the front edge is prevented. This effect is easily understood because the lubricant has flowability. In this case, there is no need to float the front pads 51, 52 (or tilt the magnetic head). This advantage is the one the usual techniques have failed to offer, and is useful for keeping the device portion and the recording medium in close vicinity.

By using the pads shaped according to the present invention, excess lubricant is efficiently rejected without changing the position of the magnetic head (without floating the front pads high). This arrangement enables the magnetic head to be contact sliding continuously within a wide range of yawing angle.

In the present invention, the magnetic head sliding surface should be in contact with the surface of the recording medium to within a good accuracy. A special technique is thus required in assembling the apparatus. Such a technique has not been proposed by the prior art. To achieve a prolonged life of the apparatus under the operating condition that the magnetic head is kept in continuous contact sliding on the recording medium, abrasion taking place between the magnetic head and the recording medium should be slowed as much as possible. To this end, typically available is a technique in which contact sliding is performed through a lubricant layer interposed between the magnetic head and the recording medium, each of which is coated with a protection layer made of a hard carbon. Even with such a technique employed, abrasion still takes place and abrasion depends on load. Then, a diversity of techniques to lighten the load of the magnetic head to an extreme level have been proposed.

Figure 21A:
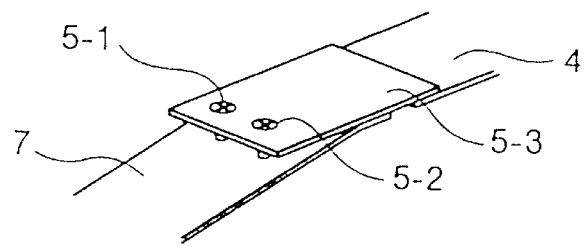
FIGS. 21a, 21b and 21c are views showing the structure of novel arms for keeping the sliding surface of the magnetic head.

Under a light load condition, rigidity of the gimbal for adjusting the position of the magnetic head should also be lowered. An extremely lower rigidity of the gimbal makes the position of the magnetic head unstable while it is seeking. To resolve this problem, compared to the known magnetic disk device, a harder gimbal (relative to the load) should be used. The harder gimbal, however, presents difficulty in making the magnetic head sliding surface contact precisely the surface of the recording medium. In the present invention, an adjustment mechanism 5-3 having a gimbal function is newly provided between a gimbal member 7 supporting the magnetic head and an arm 4 connected to the actuator as shown in FIG. 21a. The adjustment mechanism 5-3 is provided with an adjustment portion, which screws 5-1, 5-2 fix to the gimbal member 7 for adjustment during assembly of the apparatus. After a worker adjusts the adjustment portion, it is fixed with the screws to provide continuous contact sliding state.

Figure 21B:
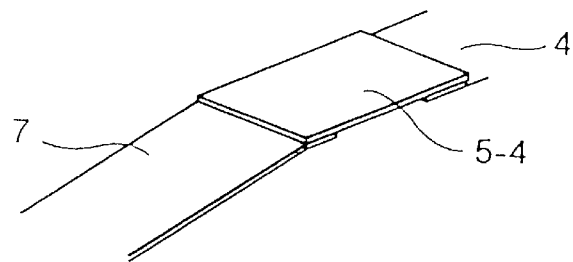

A form remember metal may be used as an adjustment mechanism 5-4 as shown in FIG. 21b. In this case, a predetermined heat treatment is performed to the adjustment mechanism 5-4 with the magnetic head forced against the recording medium, so that deformation of the form remember metal required to keep the contact sliding condition is maintained. In this way, the relationship between the gimbal member 7 and the arm 4 is fixed so that the continuous contact sliding is maintained even after the forced contact sliding condition is released.

Figure 21C:
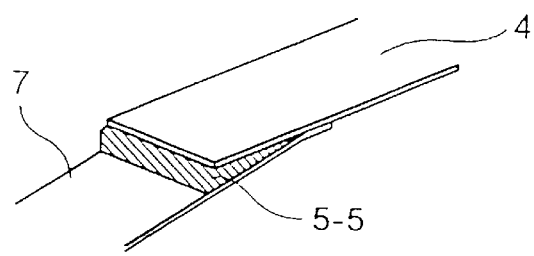
Figure 22:
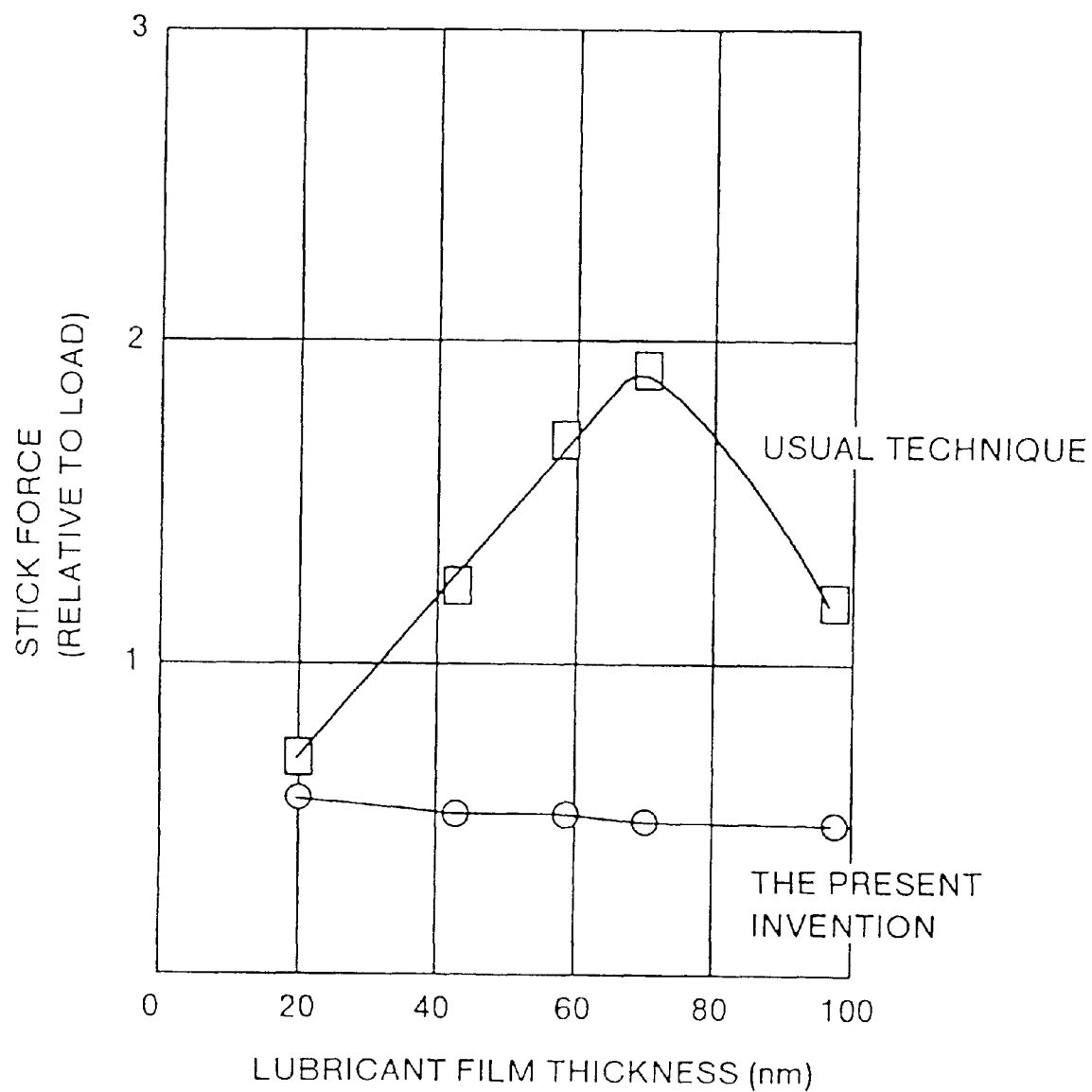
FIG. 22 is a graph showing the relationship of stick force with the thickness of the lubricant according to the present invention.

A thermal softening polymer 5-5 may be used as an adjustment mechanism as shown in FIG. 21c. The condition that the magnetic head is put into contact with the recording medium is maintained by using the heat softening polymer 5-5 as pressure contact means and heat treatment means. Specifically, heat is added to allow the heat softening polymer to deform to a required degree, and then the heat softening polymer is left to cool to fix the relationship of the gimbal member 7 with the arm 7 in a manner that the magnetic head is put into contact sliding.

These adjustment mechanisms will be described more in detail later.

The contact sliding condition between the magnetic head and the recording medium is effectively maintained by supporting the magnetic head 2 with the gimbal of bifurcated leaf springs 71, 72. The gimbal have an open angle of 30° through 45° between springs 71, 72. It is thought that radial displacement of the recording medium is easier to absorb by constructing the gimbal of bifurcated leaf springs rather than a known single continuous leaf spring. Namely, making an open angle between the bifurcated springs of the gimbal increases support strength in the direction of seeking. Thus, the position of the magnetic head during seeking operation will not be destabilized even if rigidity of the gimbal is lowered. A lower rigidity gimbal tends to absorb better the displacement of the sliding surface. It is thought that the function of putting the sliding surface into contact works efficiently.

Figure 4:
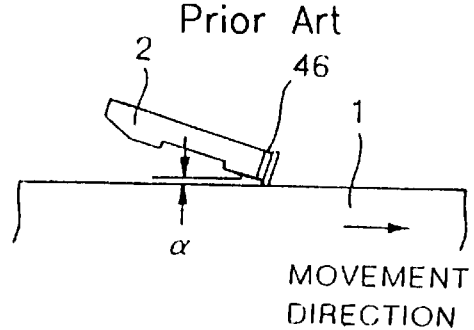
FIG. 4 is an explanatory view of the conventional magnetic head in which the front side is floated.
Figure 5A:
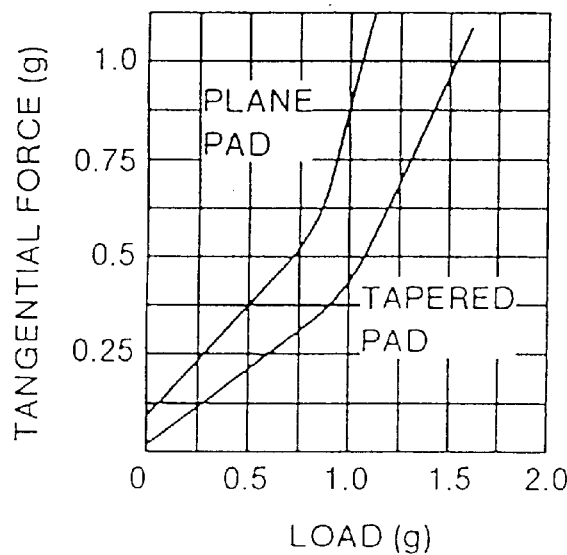
FIG. 5a is a graph showing the relationship between the load of the magnetic head and tangential force.
Figure 5B:
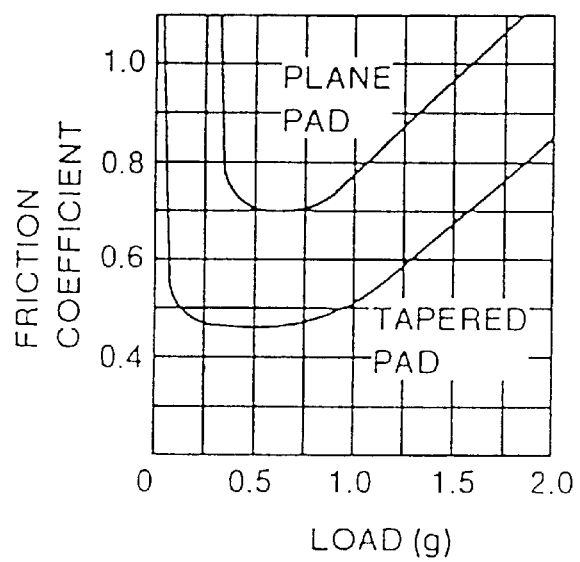
FIG. 5b is a graph showing the relationship between the load of the magnetic head and friction coefficient.

In the magnetic head provided with two front pads and a rear pad having a write/read component as shown in FIG. 17, the flying force of the front pads was negligibly small when the sum area of the front pads was set to be $5.0 \times 10^{-9}$ m$^2$ or smaller. FIG. 15 shows the test result. According to the result, if the head load is set to within the range specified by our invention (1 g at maximum), a constant high output is obtained with the pad size set to $5.0 \times 10^{-9}$ m$^2$ or less. With wider pad size, the output drops. This is because floating pads position the head as shown in FIG. 4, causing the device and the medium to part. This suggests that a small pad size limits flying force. With a load of 1 g or smaller, the size or area of the front pads should be set even smaller. At any rate, the conditions specified in our invention are satisfied.

As described above, the load of the magnetic head should be reduced to slow abrasion arising from continuous contact sliding as much as possible. In our invention, the load is set to be within a range of 10 mg to 1 g. According to tests, frictional force during contact sliding (resisting force taking place when the magnetic head slid on the lubricant) was determined by the load, and dropped as the load became lighter. With a load of 10 mg or smaller, however, frictional force works more powerfully than the load, destabilizing the position of the magnetic head. It is considered that resistance arising from the lubricant becomes dominant in the frictional force. To keep the magnetic head to its stable position, it is obviously necessary to press the magnetic head against the recording medium at a load within the range determined in tests.

Figure 11A:
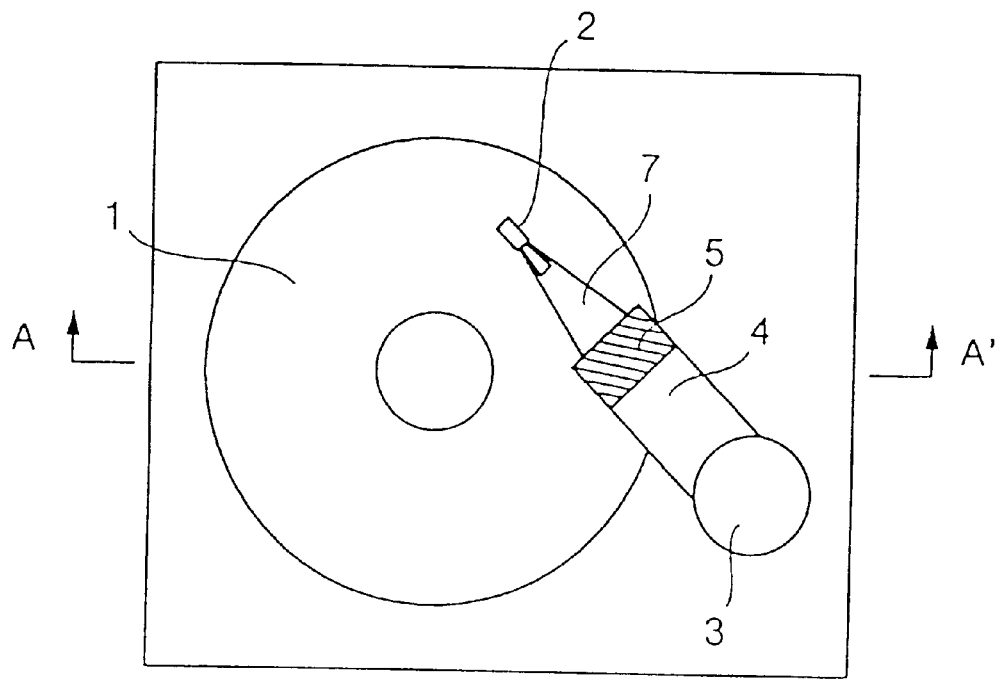
FIGS. 11a and 11b are schematic views of the magnetic storage apparatus according to an embodiment of the present invention.
Figure 11B:
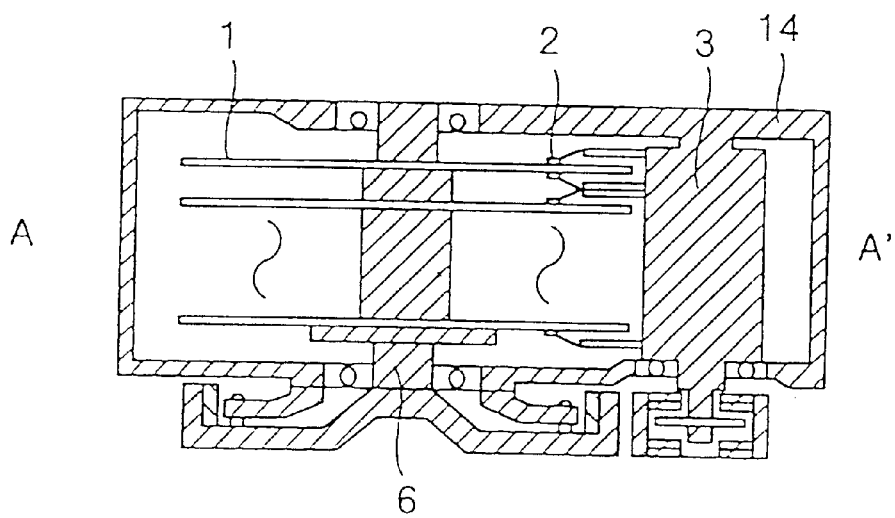

FIG. 11 shows the magnetic storage apparatus of this embodiment. FIG. 11a is the plan view of the apparatus, and FIG. 11b is the cross-sectional view taken along the line A—A'. The magnetic head 2 having the three pads is supported by the gimbal member 7, which is then connected the arm 4. Provided between the arm 4 and the gimbal 7 is the adjustment mechanism 5 which adjusts the contact sliding between the sliding surface and the recording medium. The arm 4 is secured to the actuator 3 that positions the magnetic head 2 relative to the recording medium 1. The recording medium is directly coupled to the motor 6. These components are housed in a case 14. In this apparatus, a storage capacity of about 10 GB per recording medium is achieved. By stacking recording media as shown, a magnetic storage apparatus having an extremely large storage capacity ranging from a few tera bytes to peta bytes is provided.

FIG. 21a shows one example of the adjustment mechanism that adjusts the contact sliding between the sliding surface and the surface of the recording medium. Two screws 5-1, 5-2, one on the right-hand side, the other on the left-hand side of the mechanism, press the gimbal member 7 that supports the magnetic head. By adjusting the screws 5-1, 5-2, the deflection of the gimbal member 7 is changed leftward or rightward. The position of the magnetic head is thus controlled. This adjustment was performed such that a maximum output level was obtained in a reliable fashion after a predetermined signal was written. The adjustment mechanism was constructed of a metal such as stainless steel, polymer, or composite material containing graphite or the like.

The above mechanism is a mechanical one. Alternatively, our invention was embodied by connecting the form remember metal 5-4 between the gimbal member 7 and the arm 4 as shown in FIG. 21b. The form remember metal 5-4 was constructed of an NiTi alloy, which had a feature of memorizing a deformation that was set in a deformation setting process above a predetermined temperature. In our invention, to take advantage of this feature, the magnetic head was first supported by the gimbal member 7, and then an external force was exerted to the magnetic head so that the magnetic head sliding surface was forced against the surface of the recording medium. In this condition, heat was applied to allow the form remember metal 5-4 to memorize the deformation required to make the magnetic head contact the surface of the recording medium. Since the deformation was memorized after heat was removed, a continuous contact engagement remained working after the forced contact engagement was released.

The same effect was achieved by the adjustment mechanism of the heat softening resin 5-5 as shown in FIG. 21c. In the same way as the form remember metal, heat was applied to the resin 5-5 under a forced contact engagement, and the resin was softened and a deformation between the arm 4 and the gimbal member 7 occurred. When heat was removed, the resin hardened with the deformation required for contact engagement maintained. Even after the forced contact engagement was released, a continuous contact engagement continued.

The contact engagement between the magnetic head and the recording medium was more effectively maintained by the gimbal having the bifurcated leaf springs with an open angle of 30° to 45° therebetween. As already described, the gimbal having the bifurcated leaf springs tends to absorb the radial displacement of the recording medium. Therefore, the sliding surface was successfully continuously put into contact with the recording medium. The gimbal member was constructed of stainless steel sheet of 25 through 30 $\mu$m thick. Other material was perfectly acceptable as long as it had rigidity of the same level.

The magnetic head was constructed of a hard AlTi carbide substrate or the like. As shown in FIG. 17, the magnetic head was provided with two front pads on its inlet side with respect to the recording medium and one rear pad with the functional component for writing and reading information. The pads were machined using Ion milling or other machining techniques. In this case, the etch depth was about 20 $\mu$m. Each of the front pad was 50 $\mu$m by 50 $\mu$m wide. The sum area of both pads was $5.0 \times 10^{-9}$ m$^2$. The flying force generated by the pads were so small that we were able to neglect it.

The shape of the rear pad was an elongated pentagon with its sharpened top apex pointing to the front as shown in FIG. 17a, with its base being 150 $\mu$m across and its height being 300 $\mu$m. This shape was one example only, and no substantial difference was observed even with the sharpness of the top apex of the pentagon varied. In this embodiment, the rear pad was symmetrical with respect to its center line. The shape of the rear pad was preferably designed such that the direction of rotation of the recording medium agreed with the center line of the rear pad when the magnetic head was positioned in the middle point of a seek range. When both failed to agree, however, a good contact sliding was achieved by setting the sharpened triangular portion of the pentagon symmetrical with respect to a tangential line aligned with the direction of rotation of the recording medium at the middle point of the seek range.

The same effect was achieved by using the elongated pad having its long sides aligned with the direction of contact sliding as shown in FIG. 17b. In this embodiment, the short sides across were 100 $\mu$m and long sides were 200 $\mu$m.

In this embodiment, to attain a service life of 5 years of continuous contact sliding of the magnetic head on the recording medium, the magnetic head was coated with a carbon film of 10 nm thick and the magnetic thin film of the recording medium was coated with a carbon film of 10 nm thick. A sputtering technique was used in the coating process. In coating the magnetic head that needs a particularly hard carbon film, vapor growth technique proved useful. The lubricant layer was disposed on top of the protection layer.

Embodiment 3

A magnetic head, which is constructed to have multiple tapers by tapering sliding pads of the present invention and then by selectively forming a thin film on front pads, achieves a minimum contact area with a lubricant layer. This effect allows the magnetic head to be constantly in contact with the recording medium for recording and reproducing operation. The same effect was achieved by the structure shown in FIG. 23.

Figure 23:
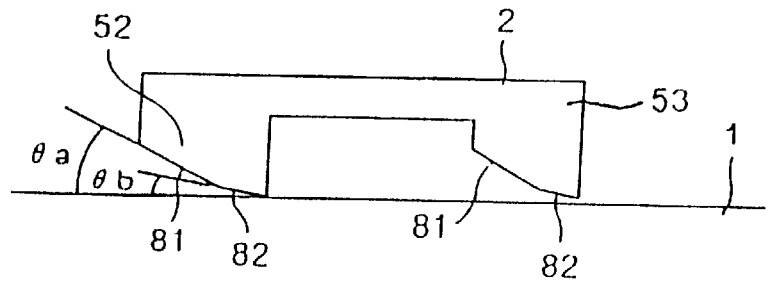
FIG. 23 is a cross-sectional view of the magnetic head according to the present invention, taken along its contact sliding pad.

FIG. 23 shows the cross section of the magnetic head taken longitudinally along its sliding pads. The magnetic head is provided with a front sliding pad 52 and a rear sliding pad 53. Each of the sliding pads has surfaces a81 and b82. An angle θa which the surface a81 makes with the surface of the medium 1 is greater than an angle θb which the surface b82 makes with the surface of the medium. In this case, the area of the surface a81 is greater than the area of the surface b82. In FIG. 23, θb is not zero.

Frictional force was reduced by minimizing the area of the surface b82 and making the angle θb small.

Figure 24A:
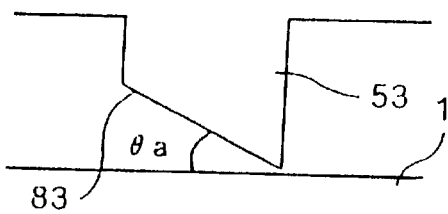
FIG. 24a is a cross-sectional view of the conventional magnetic head, taken along its contact sliding pad.
Figure 24B:
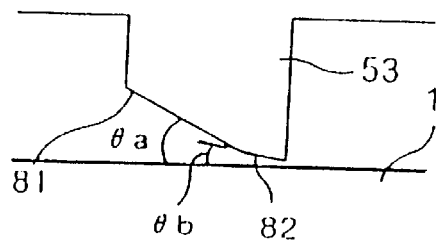
FIGS. 24b and 24c are sectional views of a magnetic head cut in a pad portion for sliding according to the present invention.

In the sliding pad having dual tapers as shown in FIG. 24b, the flying force generated by the surface b82 close to the recording medium surface can be factored in design stage. Since the angle θb is smaller than the angle θa with respect to the surface of the recording medium, abrasion of the surface b82 is slowed. As a result, a reliable contact sliding with small variations in flying force was achieved.

Figure 24C:
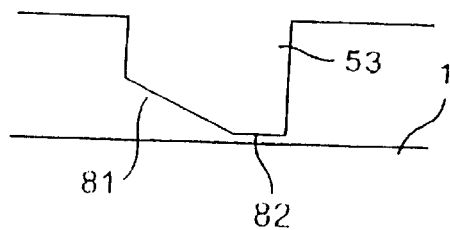

The same effect was achieved by forming another surface 82 by polishing the edge portion of the surface 81 as shown in FIG. 24c during manufacture on the assumption that the surface 83 in FIG. 24a is abraded during use. By factoring the effect of the surface 82 in flying force in design stage, a reliable contact sliding with small variations in flying force was achieved.

Figure 25A:
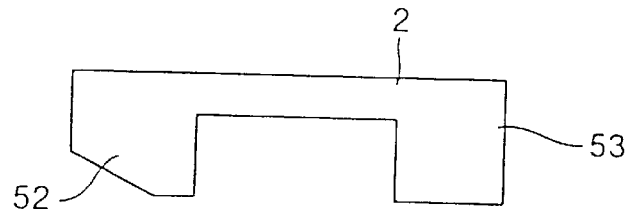
FIGS. 25a, 25b, 25c and 25d are schematic view showing the manufacturing process of the contact sliding pad having dual or further multiple tapers.
Figure 25B:
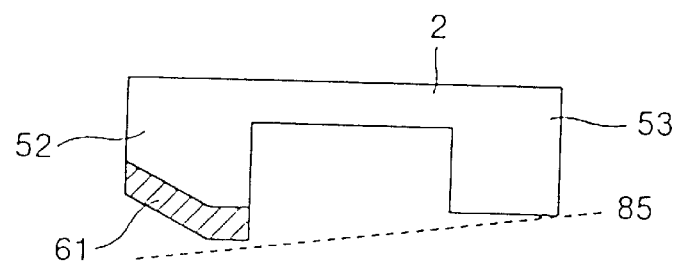

No manufacturing method of the sliding pad having at least dual tapers as shown in FIGS. 23 and 24b has been disclosed until now. Referring to FIG. 25, this method is now discussed. FIG. 25 is the cross-sectional view showing the magnetic head including the sliding pads 52, 53. The front sliding pad 52 is tapered. It is well known that the rear pad 53 is difficult to taper from the machining standpoint. Next, as shown in FIG. 25b, the front pad 52 of the magnetic head 2 is coated with a film 61. This step tilts all pads with respect to the surface of the recording medium 85. The process up to now remains unchanged from that of the preceding embodiments.

Figure 25C:
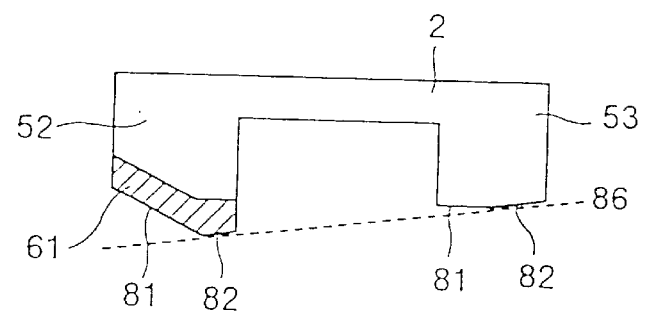
Figure 25D:
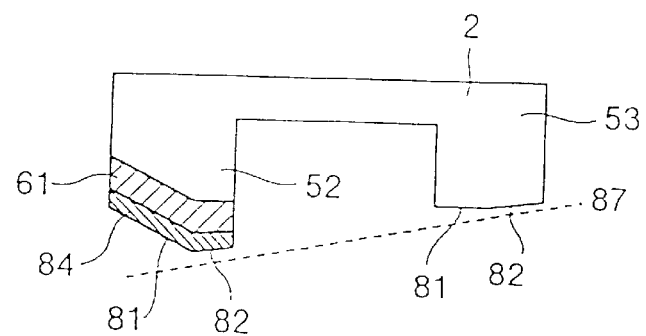

Next, as shown in FIG. 25c, the pads are machine-polished at a plane 86 in parallel with the surface 85 of the recording medium to form a surface 82. This process produces dual tapers of surfaces 81, 82 on each of the pads. By factoring a new flying force generated by the surface 82 into design, a reliable contact sliding with small variations in flying force is achieved.

By coating further the front pad 52 with a film 84 in addition to the film 61, a tilt with respect to the recording medium surface 87 is made. This process reduces further contact force. To form the structure in FIG. 25d, the front pad 52 should be coated with dual films and should be machine-polished after the first coating. It is easily understood that repeated steps of in FIGS. 25c and 25d produce a plurality of tapers on the pads. In embodying of the present invention, the area of the surface 82 should be kept to a minimum in order to reduce frictional force (contact force) during contact sliding.

The sliding pads having dual tapers of the present invention suffer less abrasion on their edges and constitute a magnetic head with small variations in flying force. Thus, a contact sliding as reliable as that in the embodiments 1 and 2 is achieved. With the magnetic head of the present invention incorporated in the apparatus in the same way as in the prior art, a high-density magnetic storage apparatus having a recording density of 10 Gb/in$^2$ is provided.

According to the present invention, the magnetic head offers a reliable continuous contact sliding with the sliding surface of the pads kept in contact with the recording medium. A super-high density storage apparatus having a recording density of 10 Gb/in$^2$ or more is thus provided.

What is claimed is:

1. A magnetic head and slider configuration having sliding pads on its sliding surface, wherein said sliding pads include front pads and a rear pad, the front pads being tapered toward their front sides and higher in height than the rear pad, wherein a sum area of the sliding pads is within a range of 0.0003 to 0.02 mm$^2$ and wherein a recording and reproducing operation is performed with the front pads and the rear pad concurrently kept in contact sliding with a surface of a recording medium.

2. The magnetic head and slider configuration according to claim 1, wherein the tapered front pads are coated with a thin film.

3. The magnetic head and slider configuration according to claim 1, wherein said sliding pads include a total of three pads, two pads on the front side and one pad on the rear side.

4. The magnetic head and slider configuration according to claim 1, wherein a cross section of a lamination film, made of carbon as its main constituent, is provided onto the pad surface of the rear pad.

5. The magnetic head and slider configuration according to claim 1, wherein a load of the magnetic head falls within a range of 10 mg to 1 g.

6. The magnetic head and slider configuration according to claim 1, wherein the sliding pads include a total of three sliding pads, two pads on its front side and one pad on its rear side, whereby all sliding pads are tapered toward their front ends, and the height of the front pads is higher than the height of the rear pad.

7. The magnetic head and slider configuration according to claim 1, wherein the sliding pads include a total of three sliding pads, two pads on its front side and one pad on its rear side, whereby all sliding pads are dual-tapered or further multiple-tapered.

8. The magnetic head and slider configuration according to claim 7, wherein said multiple tapers are formed by coating the front pads with a thin film, by partly etching the front pads, and then by further coating the front pads with a thin film.

9. The magnetic head and slider configuration according to claim 1, wherein the surfaces of said tapered sliding pads are constituted by surface a and surface b, and, in comparison of the surface a to the surface b, the area of the surface a is greater than the area of the surface b on condition that the relationship θa>θb holds where θa represents the angle the surface a makes with a recording medium and θb is the angle the surface b makes with the recording medium.

* * * * *

UNITED STATES PATENT AND TRADEMARK OFFICE
CERTIFICATE OF CORRECTION

Figure 14A:
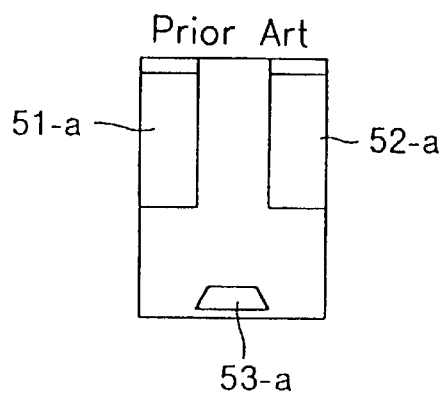
FIGS. 14a, 14b and 14c are diagrams showing the relationship between the yawing angle of each set of pads and its output.
Figure 14B:
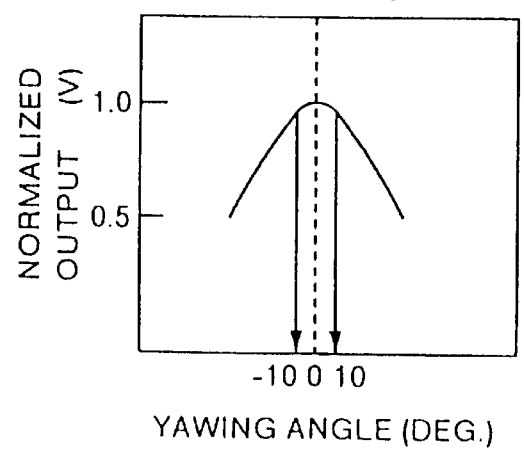
Figure 14C:
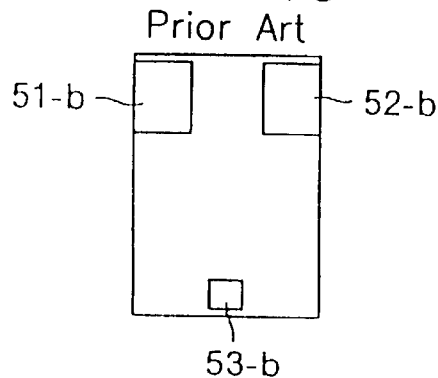
Figure 14D:
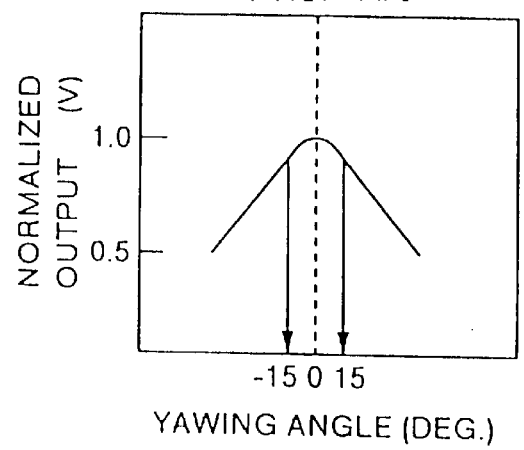

PATENT NO. : 5,898,540                    Page 1 of 3
DATED      : April 27, 1999
INVENTOR(S): Yohji Maruyama, et al It is certified that error appears in the above-identified patent and that said Letters Patent is hereby corrected as shown below:

| Column | Line | |
|---|---|---|
| 1 | 31 | Change "a magnetic" to --its magnetic--. |
| 1 | 62 | Change "No. 51" to --No. S1--. |
| 3 | 20 | Change "clearance a" to -- clearance $\alpha$ --. |
| 4 | 27 | Change "FIG. 14" to --FIGS. 14a-14f--. |
| 4 | 28 | Change "shows" to --show--. |
| 4 | 30 | Change "FIG. 14a shows" to --FIGS. 14a and 14b show--. |
| 4 | 38 | Change "FIG. 14a" to --FIG. 14b--. |
| 4 | 39 | Change "FIG. 14b" to --FIG. 14d--. |
| 4 | 58 | Change "FIGS. 14a and 14b" to --FIGS. 14b and 14d-- |
| 9 | 43 | Before "1c" delete "and"; after "1c" insert --and 1d--. |

UNITED STATES PATENT AND TRADEMARK OFFICE
CERTIFICATE OF CORRECTION

Figure 14E:
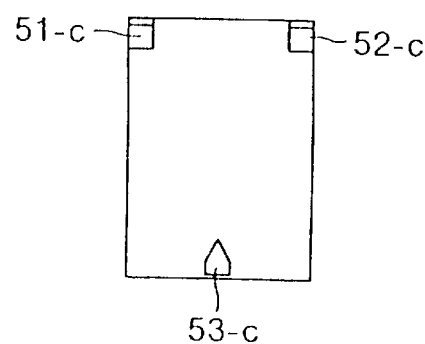
Figure 14F:
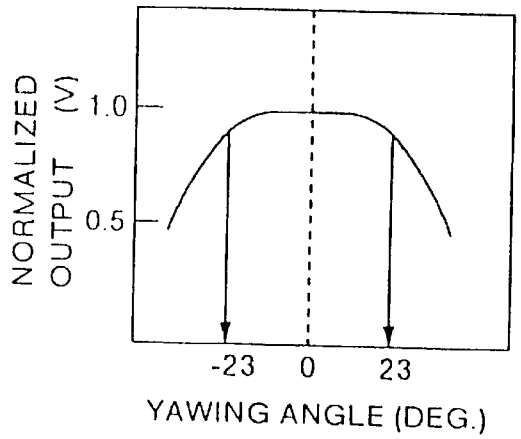
Figure 18:
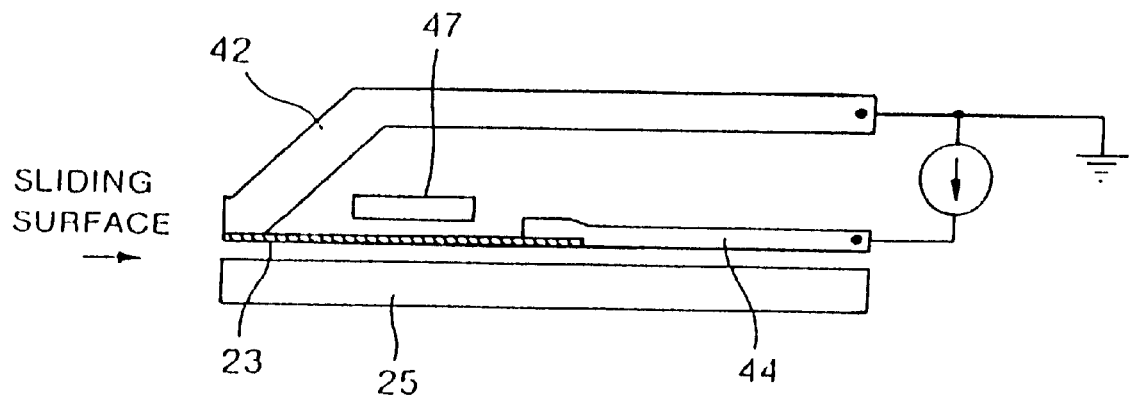
FIG. 18 is a cross-sectional view of the conventional magnetic head having a vertically aligned magnetoresistance effect pickup.

PATENT NO. : 5,898,540
DATED : April 27, 1999
INVENTOR(S) : Yohji Maruyama, et al It is certified that error appears in the above-identified patent and that said Letters Patent is hereby corrected as shown below:

| Column | Line | |
|---|---|---|
| 10 | 11 | Change "FIG. 16 is" to --FIGS. 16a, 16b, and 16c are-- |
| 10 | 13 | Before "17c" delete "and"; after "17c" insert --17d, 17e and 17f--. |
| 10 | 41 | Delete "OF THE". |
| 10 | 42 | Delete "PREFERRED EMBODIMENTS". |
| 10 | 48 | Change "head, along with its" to --head. FIG. 1d is a--. |
| 10 | 49 | Change "the line A -- A'" to --the line 1d --1d of FIG. 1a--. |
| 13 | 60 | Change "within +15°" to --within ±15°--. |
| 15 | 6 | Change "FIG. 14c shows" to --FIGS. 14e and 14f show--. |

UNITED STATES PATENT AND TRADEMARK OFFICE
CERTIFICATE OF CORRECTION

PATENT NO. : 5,898,540  
DATED : April 27, 1999  
INVENTOR(S) : Yohji Maruyama, et al Page 3 of 3

It is certified that error appears in the above-identified patent and that said Letters Patent is hereby corrected as shown below:

| Column | Line | |
|---|---|---|
| 15 | 10 | After "FIGS. 14a" insert --FIGS. 14a -- 14b--. |
| 15 | 11 | Change "14b to --14c-14d -- |
| 15 | 16 | Change "FIG. 16" to -- FIGS. 16a - 16c |
| 15 | 17 | Delete "the right-hand section of". |
| 15 | 18 | Change "FIG. 16 " to --FIG. 16c--. |
| 15 | 23 | Change FIG. 17b" to --FIGS. 17c and d--. |
| 15 | 30 | Change "FIG. 17c" to --FIGS. 17e and 17f--. |
| 16 | 52 | Delete FIG. 17 to --FIGS. 17a–17f--. |
| 18 | 29 | Change "FIG. 17a" to --FIGS. 17a and 17b--. |
| 18 | 45 | Change "FIG. 17b" to --FIGS. 17c and 17d--. |

Signed and Sealed this

Fifteenth Day of August, 2000

Attest:

Q. TODD DICKINSON

*Attesting Officer*     *Director of Patents and Trademarks*